United States Patent
Fujinaga

(10) Patent No.: US 9,218,549 B2
(45) Date of Patent: Dec. 22, 2015

(54) PRINTING APPARATUS AND PRINT CONTROL METHOD

(71) Applicant: CANON KABUSHIKI KAISHA, Tokyo (JP)

(72) Inventor: Seiya Fujinaga, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/039,166

(22) Filed: Sep. 27, 2013

(65) Prior Publication Data

US 2014/0104625 A1    Apr. 17, 2014

(30) Foreign Application Priority Data

Oct. 16, 2012    (JP) .................................. 2012-229239

(51) Int. Cl.
  *B41J 2/165*    (2006.01)
  *G06K 15/10*    (2006.01)
  *G06K 15/02*    (2006.01)
  *B41J 2/005*    (2006.01)

(52) U.S. Cl.
  CPC ............. *G06K 15/102* (2013.01); *B41J 2/0057* (2013.01); *G06K 15/022* (2013.01); *G06K 2215/0082* (2013.01)

(58) Field of Classification Search
  USPC ................................................. 347/22, 23, 29
  See application file for complete search history.

(56) References Cited

U.S. PATENT DOCUMENTS

| | | | |
|---|---|---|---|
| 5,659,342 A * | 8/1997 | Lund et al. ....................... 347/35 |
| 6,619,784 B2 * | 9/2003 | Bauer .............................. 347/35 |
| 6,779,867 B2 * | 8/2004 | Shimizu et al. .................. 347/23 |
| 7,357,308 B2 * | 4/2008 | Matz ............................. 235/380 |
| 7,614,723 B2 | 11/2009 | Hatayama |
| 2004/0090487 A1 * | 5/2004 | Kanemura ....................... 347/35 |
| 2006/0055715 A1 | 3/2006 | Nakahara et al. |
| 2006/0109300 A1 * | 5/2006 | Tsuboi et al. .................... 347/23 |
| 2008/0186341 A1 * | 8/2008 | Hirato ............................... 347/9 |
| 2011/0310152 A1 * | 12/2011 | Muro et al. ...................... 347/14 |

FOREIGN PATENT DOCUMENTS

JP    2006-76247 A    3/2006
JP    2007-1118 A    1/2007

* cited by examiner

*Primary Examiner* — Julian Huffman
*Assistant Examiner* — Sharon A Polk
(74) *Attorney, Agent, or Firm* — Fitzpatrick, Cella, Harper & Scinto

(57) ABSTRACT

A number of printable images on a continuous sheet and printing throughput can be increased when printing an image in which images of different sizes coexist and are arranged. In a printing apparatus which prints a plurality of images by using a full-line inkjet printhead while conveying the sheet, the size of an image and a position of a sheet where the image is printed are analyzed from inputted image data. A necessary type of preliminary discharge is determined in accordance with the analysis result. Then, print data is generated by adding, to the image data, data for preliminary discharge complying with the determined type of preliminary discharge. It is controlled to print by the full-line printhead based on the generated print data.

12 Claims, 22 Drawing Sheets

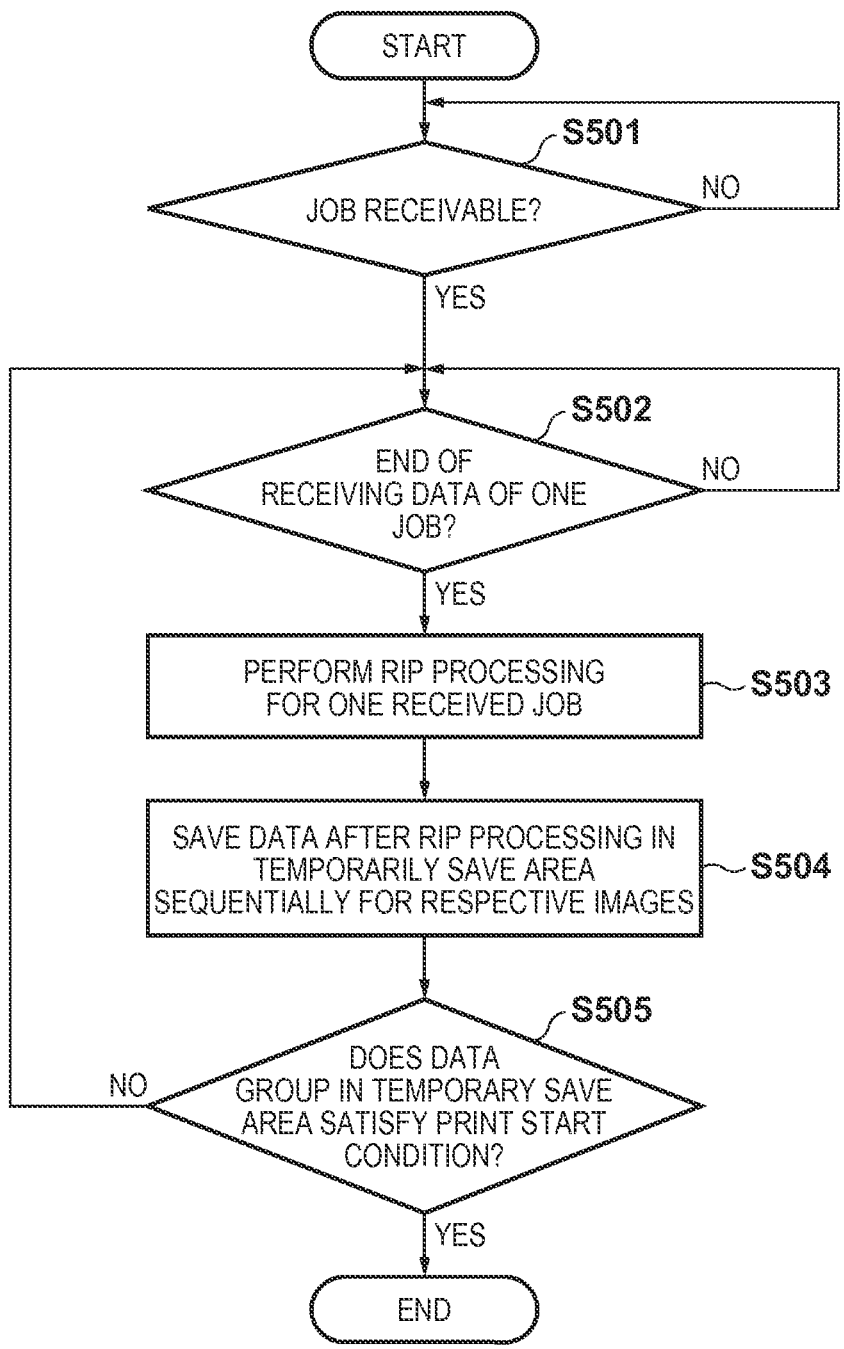

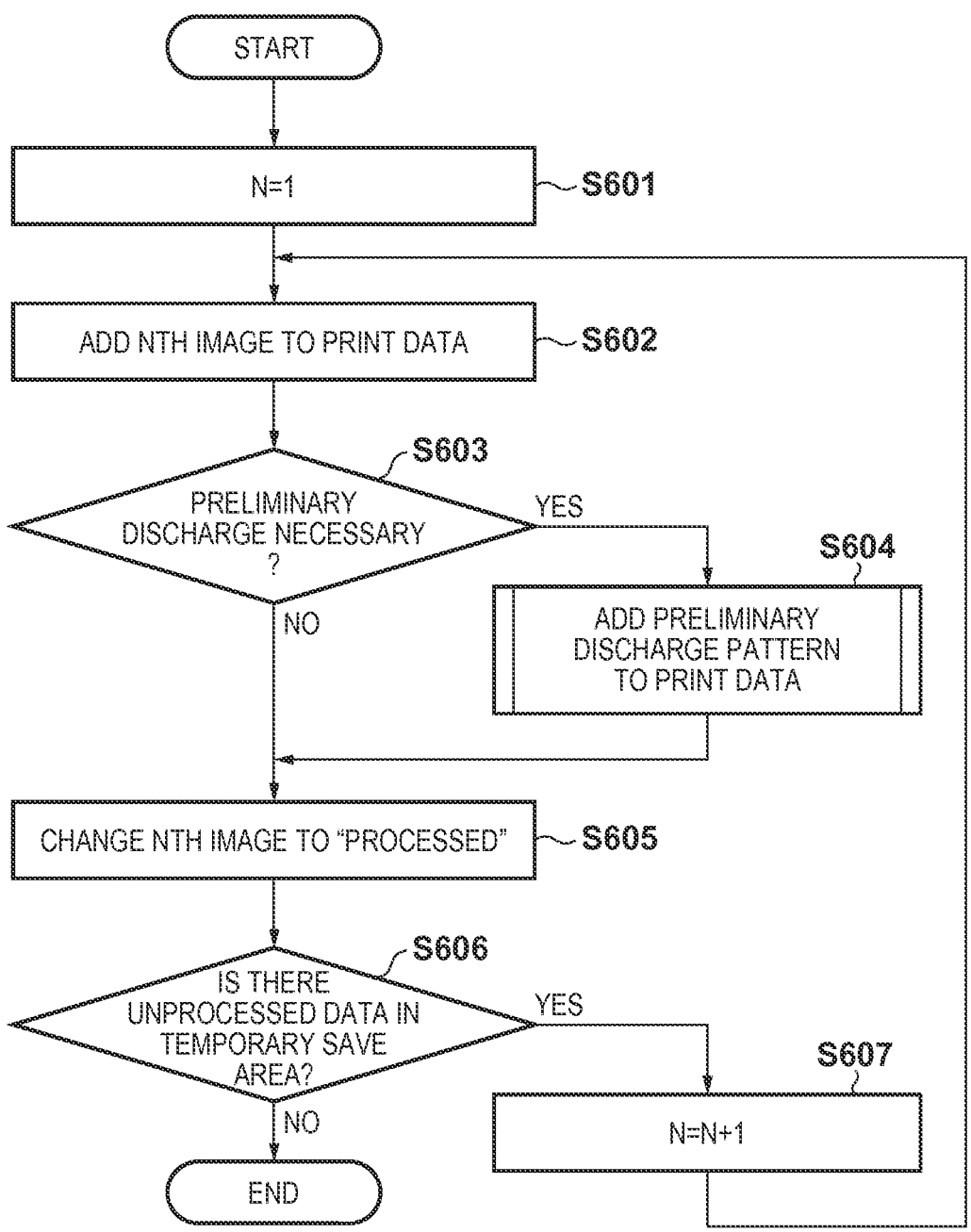

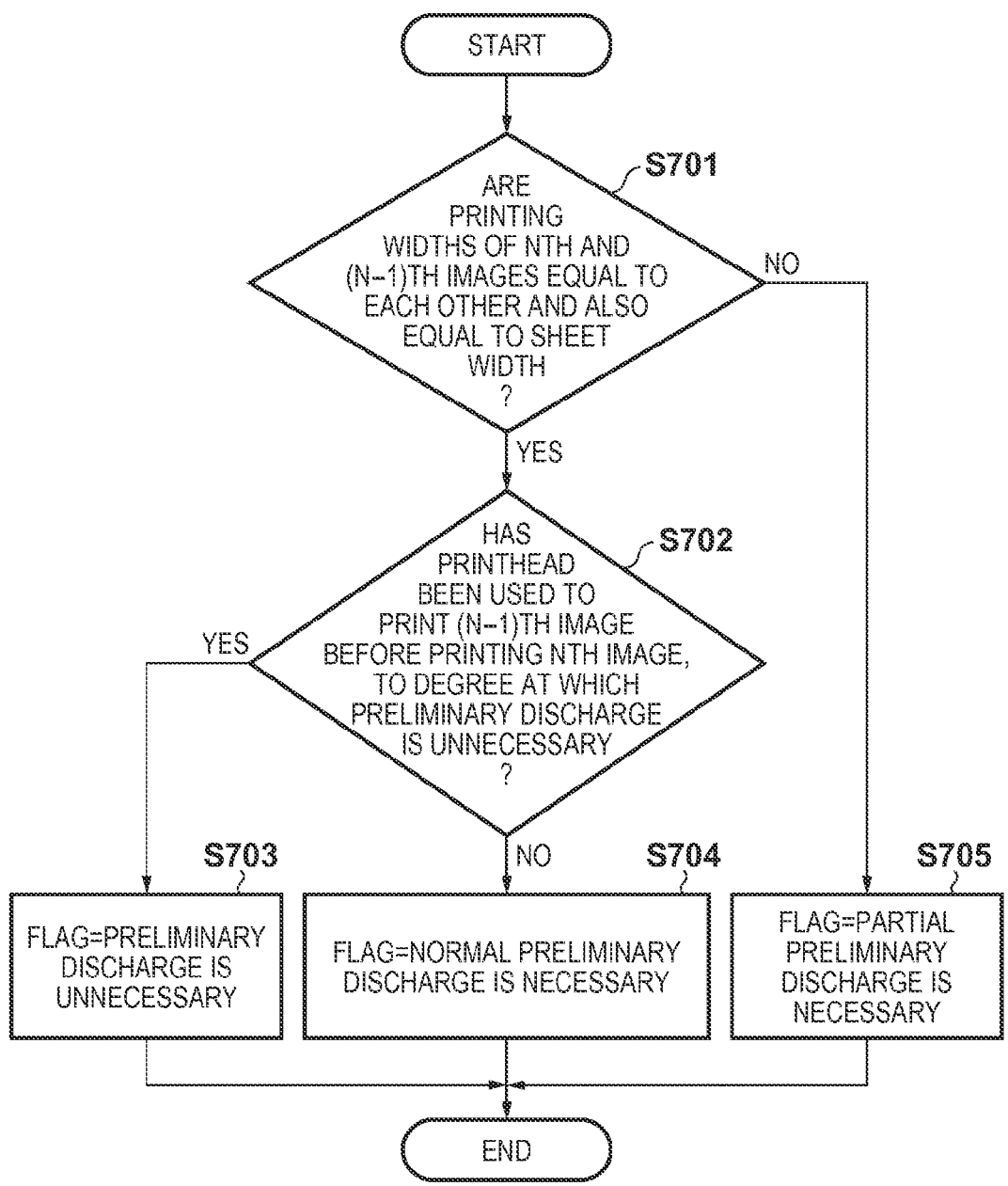

SHEET WIDTH

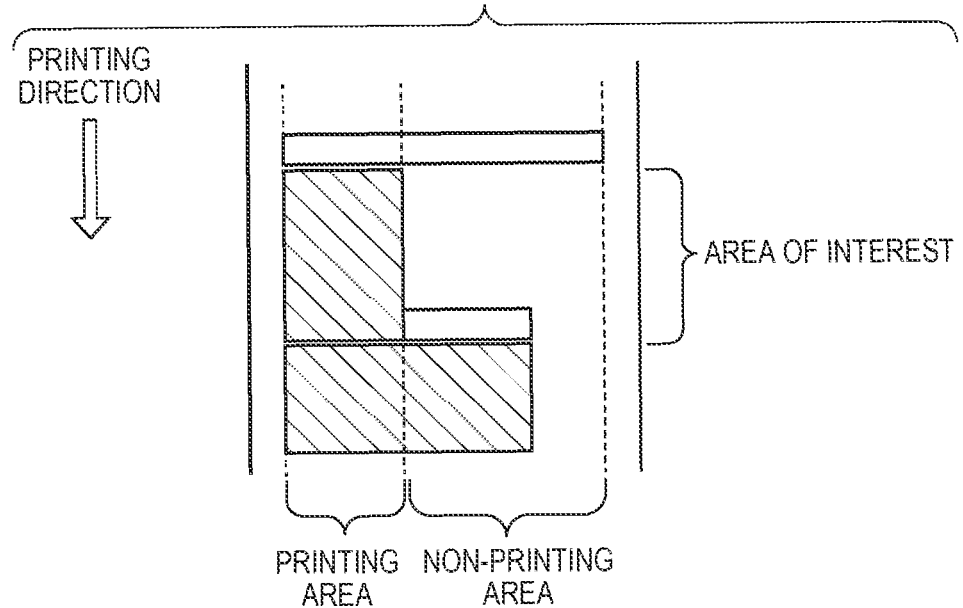
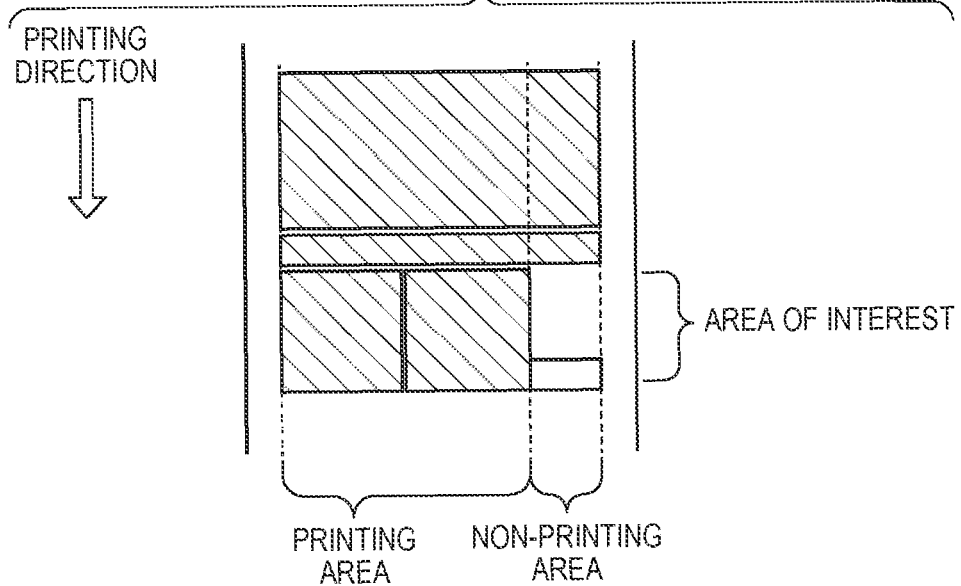

F I G. 19
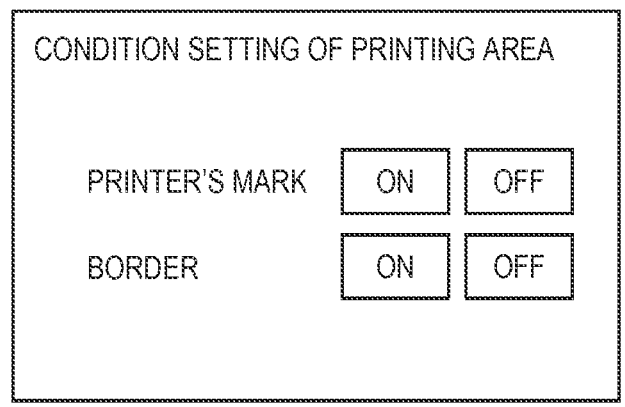

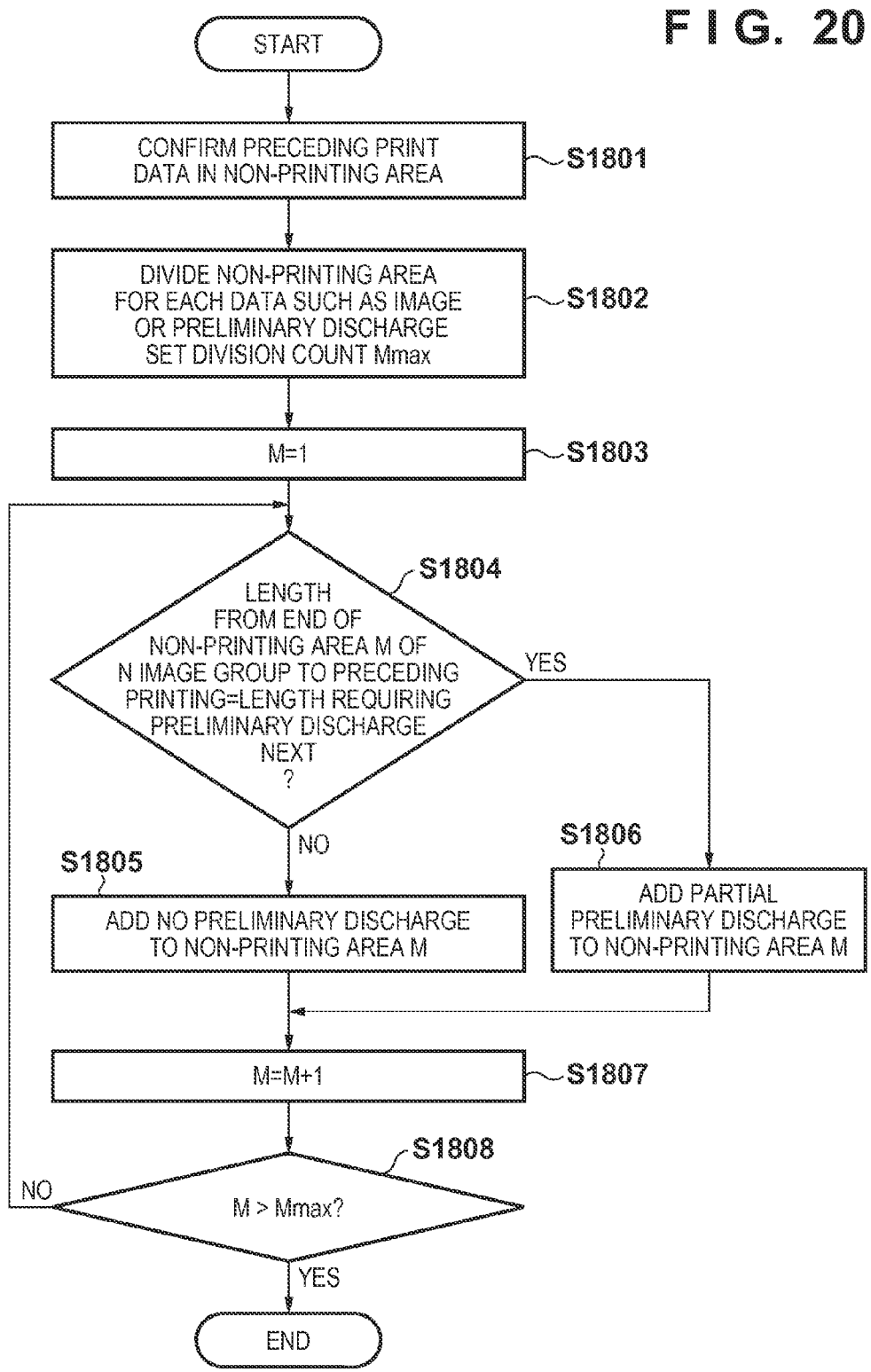

PRINTING APPARATUS AND PRINT CONTROL METHOD

BACKGROUND OF THE INVENTION

1. Field of the Invention

The present invention relates to a printing apparatus and print control method and, particularly, to a printing apparatus including, for example, an inkjet full-line printhead and a print control method for the apparatus.

2. Description of the Related Art

Conventionally, an inkjet printing apparatus prints by using an ensemble of small nozzles for discharging an ink droplet to print. Since the nozzle opening of the printhead is very small, to uniformly discharge ink and satisfy the image quality, the inkjet printing apparatus needs to take a measure to, for example, perform preliminary discharge in every predetermined time so as not to dry the nozzle.

Further, the inkjet printing apparatus performs the following control when printing on a continuous print medium (sheet) such as roll paper by using a full-line printhead (to be referred to as a printhead hereinafter) having the same width as the sheet width. More specifically, a pattern for maintaining the image quality is inserted periodically or on a certain condition between images to be printed, thereby maintaining the printing quality (see Japanese Patent Laid-Open Nos. 2006-76247 and 2007-001118).

In actual image printing, not only an image equal in size to the sheet width, but also an image smaller than the sheet width sometimes coexist and are printed. In some cases, an image smaller than the sheet width is printed, and then an image having the same width as the sheet width is printed. When an image smaller than the sheet width is printed, a portion of the full-line printhead that was used to print the image may be unnecessary for printing the image quality maintenance pattern.

However, in the related art, the pattern is printed for the entire printing width of the printhead even in this case in order to maintain the image quality of the printhead including a portion not used for image printing. Since the image quality maintenance pattern is periodically printed between printed images, the image quality maintenance pattern unnecessary as a printing result for the user is printed on a continuous sheet. This decreases the number of printable images on the continuous sheet. In addition, printing the image quality maintenance pattern decreases the actual printing throughput.

SUMMARY OF THE INVENTION

Accordingly, the present invention is conceived as a response to the above-described disadvantages of the conventional art.

For example, a printing apparatus and print control method according to this invention are capable of printing at high quality without decreasing the printing throughput even when printing a preliminary discharge pattern.

According to one aspect of the present invention, there is provided a printing apparatus which prints a plurality of images by discharging ink to a sheet by using a full-line printhead while conveying the sheet. The apparatus comprises: an input unit configured to input image data from a host apparatus; a determination unit configured to analyze, from the image data input by the input unit, a size of an image and a position of the sheet where the image is printed, and determine what type of preliminary discharge is necessary in accordance with a result of the analysis; a generation unit configured to generate print data to be used by the full-line printhead by adding, to the image data, data for preliminary discharge complying with the type of preliminary discharge determined by the determination unit; and a control unit configured to control to print by the full-line printhead based on the print data generated by the generation unit.

According to another aspect of the present invention, there is provided a print control method in a printing apparatus which prints a plurality of images by discharging ink to a sheet by using a full-line printhead while conveying the sheet. The method comprises: inputting image data from a host apparatus; analyzing, from the input image data, a size of an image and a position of the sheet where the image is printed, and determining what type of preliminary discharge is necessary in accordance with a result of the analysis; generating print data to be used by the full-line printhead by adding, to the image data, data for preliminary discharge complying with the determined type of preliminary discharge; and controlling to print by the full-line printhead based on the generated print data.

The invention is particularly advantageous since the image quality can be maintained while increasing the printing throughput, by minimizing preliminary discharge while effectively using a sheet when printing a plurality of images different in image width by using a full-line printhead.

Further features of the present invention will become apparent from the following description of exemplary embodiments (with reference to the attached drawings).

BRIEF DESCRIPTION OF THE DRAWINGS

FIG. 6 is a flowchart showing detailed processing of job data reception in step S401 of FIG. 5.

FIG. 7 is a flowchart showing detailed processing of print data generation in step S402 of FIG. 5.

FIG. 8 is a flowchart showing processing of performing condition determination of whether printing of a discharge pattern for maintaining the image quality is necessary or unnecessary when printing each image.

FIGS. 18A, 18B, 18C, 18D, 18E, 18F, 18G, and 18H are views showing specific examples of the area of interest.

FIG. 19 is a view exemplifying an operation screen used for condition setting of a printing area.

FIG. 20 is a flowchart showing detailed processing in step S1609, that is, processing of deciding the arrangement of the image quality maintenance pattern in a non-printing area.

DESCRIPTION OF THE EMBODIMENTS

Figure 1:
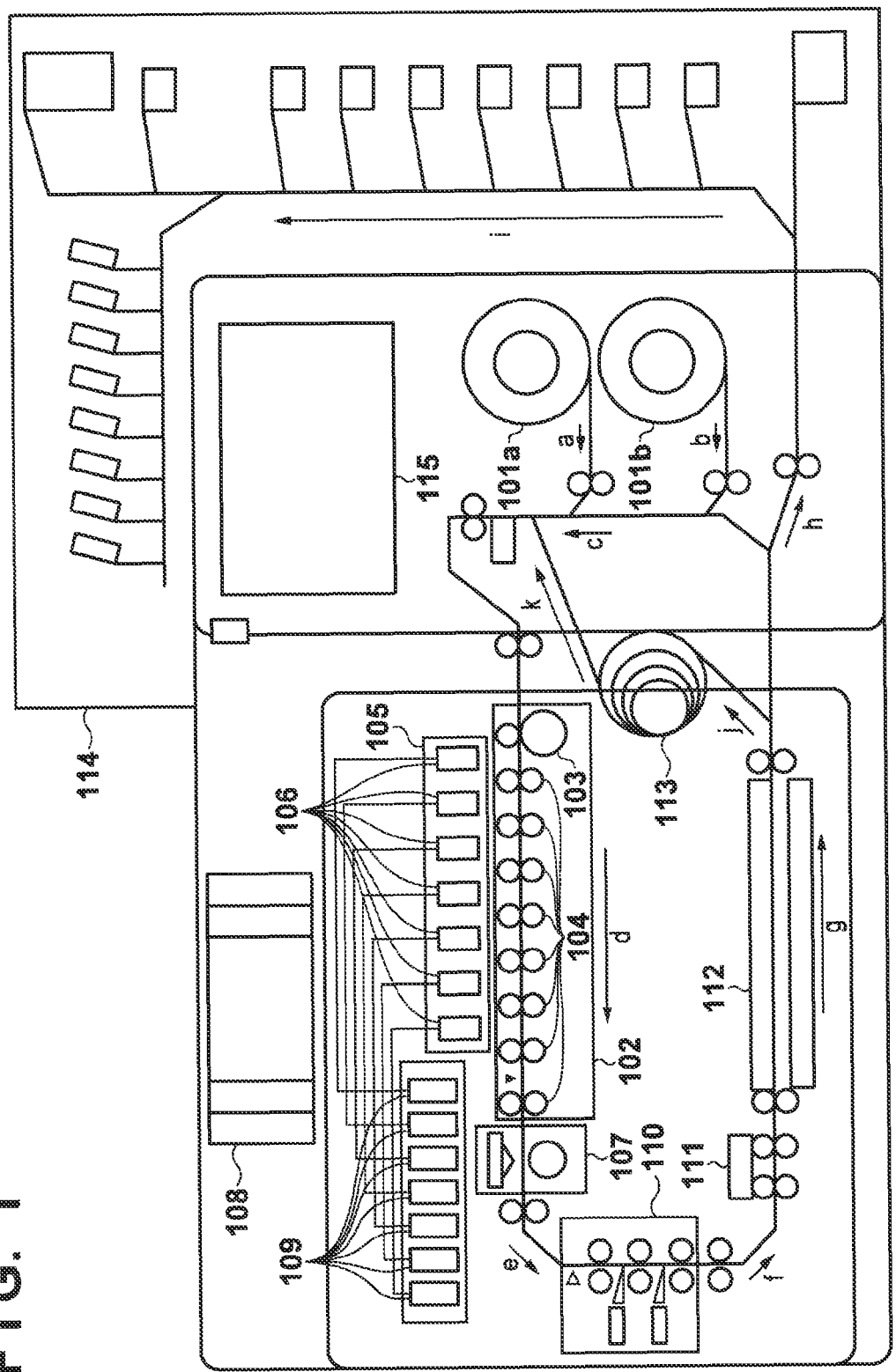
FIG. 1 is a side sectional view showing the schematic internal arrangement of an inkjet printing apparatus using a roll sheet as a print medium, as an exemplary embodiment.

Exemplary embodiments of the present invention will now be described in detail in accordance with the accompanying drawings. Note that the same reference numerals denote the same parts already described, and a description thereof will not be repeated.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, a "nozzle" generically means an ink orifice or a liquid channel communicating with it, and an element for generating energy used to discharge ink, unless otherwise specified.

A printhead substrate (head substrate) used below means not merely a base made of a silicon semiconductor, but an arrangement in which elements, wiring lines, and the like are arranged.

Further, "on the substrate" means not merely "on an element substrate", but even "the surface of the element substrate" and "inside the element substrate near the surface". In the present invention, "built-in" means not merely arranging respective elements as separate members on the base surface, but integrally forming and manufacturing respective elements on an element substrate by a semiconductor circuit manufacturing process or the like.

Next, an embodiment of an inkjet printing apparatus will be explained. The printing apparatus is a high-speed line printer which uses a rolled continuous sheet (print medium) and copes with both single-sided printing and double-sided printing. For example, the printing apparatus is suitable for the field of large-volume printing in a printing laboratory and the like.

FIG. 1 is a side sectional view showing the schematic internal arrangement of an inkjet printing apparatus (to be referred to as a printing apparatus hereinafter) using a roll sheet as a print medium, as an exemplary embodiment.

Although FIG. 1 shows only an apparatus arrangement having only the print function, the printing apparatus may function as a multi-function printer further having the scanner function of reading an image on an original, the facsimile function, and the like.

FIG. 1 exemplifies a printing apparatus using a roll sheet as a print medium. However, the print medium is not limited to the rolled form as long as it is a long continuous sheet which allows continuously printing a plurality of pages on the same surface without interrupting the printing. The continuous sheet may be cut automatically by the printing apparatus or by the user based on a manual instruction. The printing apparatus may be a printing apparatus capable of printing not only on a continuous sheet, but also on a cut sheet of a predetermined size.

The print medium is not limited to paper, and various printable media are usable, as described above.

The printing method is not limited to the inkjet method using a liquid ink. As the printing material, a solid ink may be used. Also, various methods are available, including an electrophotographic method using toner and a sublimation method. The printing apparatus is not limited to color printing using printing materials of a plurality of colors, but may perform monochrome printing using only a black (including gray) printing material.

When a printing operation in the printing apparatus is controlled in accordance with an instruction from an external apparatus connected to the printing apparatus shown in FIG. 1, this external apparatus serves as a print control apparatus.

The printing apparatus shown in FIG. 1 includes the following building components 101 to 115, which are arranged in one housing. However, these building components may be separately arranged in a plurality of housings. The control unit 108 integrates a controller (including a CPU or MPU), a user interface information output unit (generator for display information, audible information, and the like), and a control portion provided with various I/O interfaces. The control unit 108 performs various control operations of the overall printing apparatus.

The printing apparatus includes, as roll sheet units, two, upper sheet cassette 101a and lower sheet cassette 101b. The user mounts a roll sheet (to be referred to as a sheet hereinafter) in a magazine and then loads it into the printing apparatus main body. A sheet pulled out from the upper sheet cassette 101a is conveyed in the a direction in FIG. 1, and a sheet pulled out from the lower sheet cassette 101b is conveyed in the b direction in FIG. 1. The sheet from either cassette travels in the c direction in FIG. 1 and reaches the conveyance unit 102. The conveyance unit 102 conveys the sheet in the d direction (horizontal direction) in FIG. 1 during print processing via a plurality of rotating rollers 104. When switching the feed source sheet cassette from one to the other, an already pulled-out sheet is rewound into the cassette, and then a sheet is newly fed from a cassette in which the sheet to be newly fed is set.

The head unit 105 is arranged above the conveyance unit 102 to face the conveyance unit 102. In the head unit 105, the independent printheads 106 for a plurality of colors (seven colors in this embodiment) are held in the sheet conveyance direction. In this example, the head unit 105 includes seven printheads corresponding to seven, C (Cyan), M (Magenta), Y (Yellow), LC (Light Cyan), LM (Light Magenta), G (Gray), and K (blacK). Needless to say, other colors may be used, or all these colors may not be used. The printing apparatus forms an image on a sheet by discharging ink from the printhead 106 in synchronism with conveyance of the sheet by the conveyance unit 102.

Note that the printhead 106 is arranged at a position where the ink discharge destination does not overlap the rotating roller 104 in the sheet conveyance direction. Instead of directly discharging ink onto a sheet, the ink may be applied to an intermediate transfer member and then applied to a sheet, thereby forming an image. A printing unit is formed from the conveyance unit 102, head unit 105, and printheads 106.

The ink tanks 109 independently store inks of the respective colors. The inks are supplied from the ink tanks 109 via tubes to sub-tanks arranged in correspondence with the respective colors. The inks are then supplied from the sub-tanks to the printheads 106 via tubes. As the printheads 106, full-line printheads for the respective colors (seven colors in this embodiment) are provided in the d direction serving as the conveyance direction in printing. The full-line printhead corresponding to each color ink may be formed from a single seamless nozzle chip, or configured by arranging divided nozzle chips regularly in line or in a staggered array.

The embodiment uses a so-called full-line printhead in which nozzles are arranged in a range where they cover the width of the printing area of a sheet of a maximum size usable in the printing apparatus. The inkjet method of discharging ink from a nozzle can employ a method using a heater element, a method using a piezoelectric element, a method using an electrostatic element, a method using a MEMS element, and the like. Based on image data, ink is discharged from the nozzles of each full-line printhead (to be referred to as a printhead hereinafter). The discharge timing is decided based on an output signal from the conveyance encoder 103.

After an image is formed on the sheet, the sheet is conveyed from the conveyance unit 102 to the scanner unit 107. The scanner unit 107 optically reads a printed image or special pattern on a sheet to confirm whether or not the printed image has a deficiency, and confirm the state of the printing apparatus including the ink discharge state. As the image confirmation method, a method of confirming the ink discharge state by reading a pattern for checking the printhead state may be employed, or a method of confirming whether or not printing is successful comparing with an original image may be employed. Thus, the confirmation method can be appropriately selected from various methods.

The sheet is conveyed from the vicinity of the scanner unit 107 in the e direction and introduced into the cutter unit 110. The cutter unit 110 cuts the sheet at a length of a predetermined printing unit. The length of the predetermined printing unit changes depending on the size of an image to be printed. For example, the length in the conveyance direction is 135 mm for an L-size photograph, and 297 mm for the A4 size.

In single-sided printing, the cutter unit 110 cuts the sheet into a page. Depending on the contents of a print job, the cutter unit 110 may not cut the sheet into a page. In double-sided printing, the cutter unit 110 does not cut the sheet into a page for the first surface (for example, obverse surface) of the sheet, and images are continuously printed by a predetermined length. After an image is printed on the second surface (for example, reverse surface), the cutter unit 110 cuts the sheet into a page. The cutter unit 110 is not limited to a unit configured to cut a sheet for an image of one cut sheet in single-sided printing or reverse surface printing of double-sided printing. The cutter unit 110 may be a unit configured not to cut a sheet until the sheet is conveyed by a predetermined length, and cut it after the sheet is conveyed by the predetermined length. In this case, the sheet may be cut into an image of one cut sheet (one page) by a manual operation or the like using another cutter device. If cutting is required in the conveyance direction of the sheet, the sheet is cut using another cutter device.

The sheet conveyed from the cutter unit 110 is conveyed through the unit in the f direction in FIG. 1, and reaches the reverse surface printing unit 111. The reverse surface printing unit 111 is a unit configured to print predetermined information on the reverse surface of a sheet when printing an image on only one surface of the sheet. The information to be printed on the reverse surface of a sheet includes information (for example, order management number) such as a character, sign, and code corresponding to each printed image. When the printhead 106 prints an image for a print job of double-sided printing, the reverse surface printing unit 111 prints information as described above in an area other than the one where the printhead 106 prints an image. The reverse surface printing unit 111 can adopt a printing method such as application of a printing material, thermal transfer, or inkjet printing.

The sheet having passed through the reverse surface printing unit 111 is then conveyed to the drying unit 112. The drying unit 112 is a unit configured to heat, by warm air (heated gas (air)), a sheet passing through the unit in the g direction in FIG. 1, in order to dry an ink-applied sheet within a short period of time. Instead of using warm air, the drying method can employ various approaches such as cold air, warm-up by a heater, air drying by only standing, and irradiation with an electromagnetic wave such as ultraviolet light. Sheets each cut into the printing unit length pass one by one through the drying unit 112, are conveyed in the h direction in FIG. 1, and reach the sorting unit 114.

The sorting unit 114 holds a plurality of trays (18 trays in this embodiment), and determines a sheet discharge destination tray in accordance with the printing unit length or the like. A tray number is assigned to each tray. The sorting unit 114 discharges a sheet passing through the unit in the i direction in FIG. 1 to a tray corresponding to a tray number set for each printed image while confirming, by a sensor arranged on each tray, whether the tray has room or is full of sheets. As the tray serving as the discharge destination of a cut sheet, for example, a specific tray is designated by a print job issuing source (host apparatus), or a vacant tray is arbitrarily designated on the printing apparatus side.

A predetermined number of sheets are dischargeable to one tray. For a print job for which the number of sheets exceeds the predetermined value, sheets are discharged to a plurality of trays. The number, size, type, and the like of sheets dischargeable to a tray change depending on the size (type) of the tray or the like.

In FIG. 1, sheets of large sizes (larger than the L size, such as A4 size), and sheets of a small size (L size) are dischargeable to trays (to be referred to as large trays hereinafter) arranged in the longitudinal (vertical) direction. Sheets of a small size (L size) are dischargeable to trays (to be referred to as small trays hereinafter) arranged in the lateral (horizontal) direction, but sheets of large sizes cannot be discharged to them. The number of dischargeable output sheets is larger on the large tray than on the small tray. A state such as sheet discharge in progress or the completion of discharge is represented to be identifiable by the user by using, for example, a display such as an LED. For example, the respective trays are equipped with a plurality of LEDs which emit beams in different colors, and can notify the user of various states of the respective trays by the colors, lighting states, or flashing states of ON LEDs.

These trays can be prioritized. When executing a print job, the printing apparatus assigns vacant (no sheet exists) trays as sheet discharge destinations in the order of priority. As a default setting, the priority is higher for an upper one of the large trays and for a leftward one of the small trays. The priority is higher for the small tray than the large tray. This priority can be appropriately changed by a user operation or the like though the priority is set to be high for a position where the user can easily take out sheets.

The sheet take-up unit 113 takes up a sheet whose obverse surface has been printed without cutting the sheet into each page. In double-sided printing, first, a sheet having undergone image printing on the obverse surface is not cut into each page by the cutter unit 110, but is cut after the end of printing on the continuous obverse surface. The sheet having the printed obverse surface passes through the unit in the j direction in FIG. 1, and is taken up by the sheet take-up unit 113. The sheet taken up after the end of image printing on the obverse surface for a series of pages is conveyed again in the k direction in FIG. 1 after setting a surface opposite to the previous obverse surface as a printable surface, that is, turning over the surface to face the printhead 106. By this conveyance, image printing is performed on the reverse surface opposite to the previous obverse surface. In normal single-sided printing, a sheet on which an image has been printed is conveyed to the sorting unit 114 without taking up the sheet by the sheet take-up unit 113.

In double-sided printing, a sheet is taken up using the sheet take-up unit 113 to turn over the sheet and print on the reverse surface. For this reason, the surface of a sheet to be discharged to the sorting unit 114 is different between single-sided printing and double-sided printing. More specifically, in single-sided printing, turnover of a sheet using the sheet take-up unit 113 is not performed. A sheet on which an image of the first page has been printed is discharged with the image of the first page facing down. When one print job is a job including a plurality of pages, sheets are discharged to the tray from a sheet of the first page, and discharged sequentially from succeeding pages and stacked. This discharge is called face-down discharge.

In double-sided printing, turnover of a sheet using the sheet take-up unit 113 is performed. A sheet on which an image of the first page has been printed is discharged with the image of the first page facing up. When one print job is a job to output a plurality of sheets, sheets are discharged to the tray from a sheet containing the final page, and then discharged sequentially to preceding pages and stacked. Finally, a sheet on which an image of the first page has been printed is discharged. This discharge is called face-up discharge.

The operation unit 115 is a unit configured to allow the user to perform various operations, and notify him of various kinds of information. For example, the operation unit 115 allows the user to confirm a tray which has received a sheet on which an image designated by him has been printed, or the printing status of each order such as whether the image is being printed or has been printed. Also, the user can operate/confirm the operation unit 115 to check various states of the apparatus such as the ink residual amount and sheet residual amount, and issue an instruction to execute maintenance of the apparatus such as head cleaning.

Figure 2:
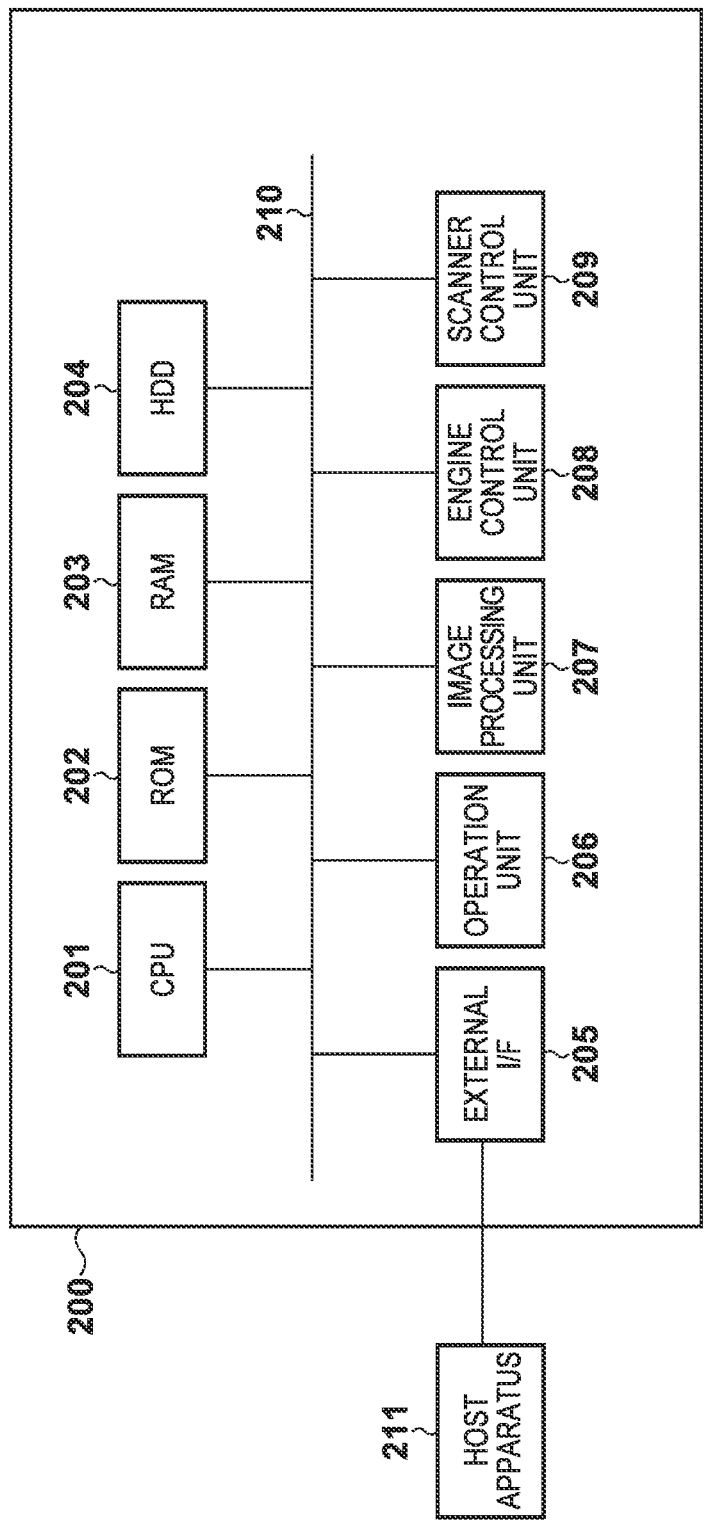
FIG. 2 is a block diagram showing the control arrangement of the printing apparatus shown in FIG. 1.

FIG. 2 is a block diagram showing a control arrangement in the printing apparatus shown in FIG. 1. In FIG. 2, a printing apparatus 200 is the printing apparatus shown in FIG. 1.

As shown in FIG. 2, the control unit 108 mainly includes a CPU 201, ROM 202, RAM 203, image processing unit 207, engine control unit 208, and scanner control unit 209. An HDD 204, operation unit 206, external I/F 205, and the like are connected to the control unit 108 via a system bus 210.

The control unit 108 in FIG. 1 includes the CPU 201 in the form of a microprocessor (microcomputer). The CPU 201 controls the operation of the overall printing apparatus 200 in accordance with execution of a program or activation of hardware. The ROM 202 stores programs to be executed by the CPU 201, and permanent data necessary for various operations of the printing apparatus 200. The RAM 203 is used as a work area by the CPU 201, used as a temporary storage area for various received data, and stores various setting data. The HDD 204 allows writing and reading out programs to be executed by the CPU 201, image data, and setting information necessary for various operations of the printing apparatus 200. Instead of the HDD 204, another mass-storage device such as a solid-state drive (SSD) is usable.

The operation unit 206 includes hard keys and a touch panel for performing various operations by the user, and a display unit for presenting (noticing) various kinds of information to the user. The operation unit 206 corresponds to the operation unit 115 shown in FIG. 1. Information can also be presented to the user by outputting a sound (for example, buzzer or voice) based on audible information from a voice generator.

The image processing unit 207 performs interpretation of image data (for example, data described in PDL) handled in the printing apparatus 200, bitmapping (conversion) into bitmap data, and image processing. The image processing unit 207 converts a color space (for example, YCbCr) representing input image data into a standard RGB color space (for example, sRGB). If necessary, the image processing unit 207 performs various image processes for image data such as resolution conversion into the number of effective pixels (printable by the printing apparatus 200), image analysis, and image correction. The image data obtained by these image processes are stored in the RAM 203 or HDD 204.

In accordance with a control command received from the CPU 201 or the like, the engine control unit 208 controls processing of printing an image based on image data on a sheet. More specifically, the engine control unit 208 executes an ink discharge instruction to the printhead 106 corresponding to each color ink, discharge timing setting for adjusting a dot position (ink landing position) on a print medium, adjustment based on acquisition of a head driving state, and the like. Further, the engine control unit 208 controls to drive the printhead in accordance with image data and discharge ink from the printhead, thereby forming an image on a sheet. Further, the engine control unit 208 controls the conveyance roller by, for example, issuing a feed roller driving instruction or conveyance roller driving instruction, or acquiring the rotating status of the conveyance roller. The engine control unit 208 causes the conveyance roller to convey a sheet at a proper speed on a proper path and stop the conveyance roller.

The scanner control unit 209 controls an image sensor in accordance with a control command received from the CPU 201 or the like, reads an image on a sheet, acquires red (R), green (G), and blue (B) analog brightness data, and converts them into digital data. As the image sensor, a CCD image sensor, CMOS image sensor, or the like is available. The image sensor may be a linear image sensor or area image sensor. Also, the scanner control unit 209 instructs driving of the image sensor, acquires the status of the image sensor based on the driving, analyzes brightness data acquired from the image sensor, and detects a discharge failure of ink from the printhead 106 and the cutting position of a sheet. A sheet for which the scanner control unit 209 determines that an image has been printed correctly undergoes drying processing for ink on the sheet, and then is discharged to a designated tray of the sorting unit.

A host apparatus 211 is an apparatus which corresponds to the above-described external apparatus, is externally connected to the printing apparatus 200, and serves as an image data supply source for causing the printing apparatus 200 to print. The host apparatus 211 issues various print job orders.

The host apparatus 211 may be implemented as a general-purpose personal computer (PC) or may be another type of data supply apparatus. Another type of data supply apparatus is, for example, an image capture apparatus which captures an image to generate image data. Examples of the image capture apparatus are a reader (scanner) which reads an image on an original to generate image data, and a film scanner which reads a negative or positive film to generate image data. Other examples of the image capture apparatus are a digital camera which captures a still image to generate digital image data, and a digital video which captures a moving image to generate moving image data. A photo storage may be installed on a network, or a socket for inserting a detachable portable memory may be provided to the printing apparatus 200. In this case, an image file stored in the photo storage or portable memory is read out to generate and print image data.

In place of the general-purpose PC, various data supply apparatuses such as a printing apparatus-dedicated terminal are available. These data supply apparatuses may be building components of the printing apparatus or separate apparatuses connected to the outside of the printing apparatus. When the host apparatus 211 is a PC, an OS, application software for generating image data, and the printer driver of the printing apparatus 200 are installed in the storage device of the PC.

The printer driver controls the printing apparatus 200. Also, the printer driver converts image data supplied from application software into a format processable by the printing apparatus 200, thereby generating image data. The host apparatus 211 may convert image data into print data and then supply the print data to the printing apparatus 200. It is not indispensable to implement all the above-described processes by software, and some or all of these processes may be implemented by hardware. Image data, other commands, status signals, and the like supplied from the host apparatus 211 can be transmitted/received to/from the printing apparatus 200 via the external I/F 205. The external I/F 205 may be a local I/F or a network I/F. The external I/F 205 may be wire-connected to an external device or wirelessly connected to an external device.

The above-described building components in the printing apparatus 200 are connected via the system bus 210 and can communicate with each other.

In the above-described example, one CPU 201 controls all the building components in the printing apparatus 200 shown in FIG. 2, but another arrangement is also possible. For example, some functional blocks may separately include CPUs and be individually controlled by their CPUs. In accordance with a role partitioning other than the arrangement shown in FIG. 2, each functional block may be appropriately divided as an individual processing unit or control unit, or several functional blocks may be integrated. In this way, various configurations can be employed. A DMAC can also be used to read out data from the memory.

Figure 3:
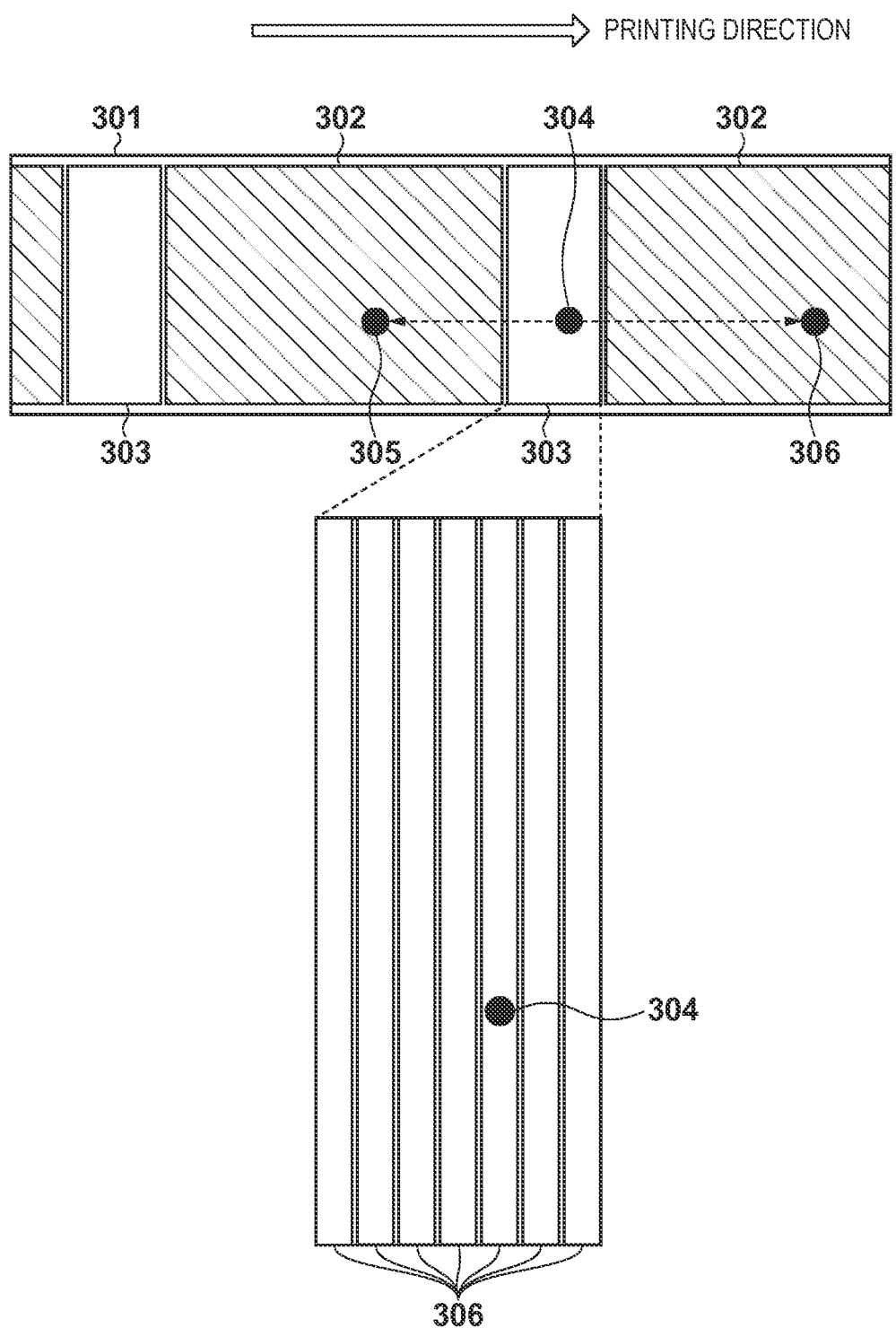
FIG. 3 is a view exemplifying an image printed on a sheet and a printing quality maintenance pattern.

FIG. 3 is a view exemplifying an image printed on a sheet and a printing quality maintenance pattern.

In this embodiment, when printing an image on a sheet, print data is generated by combining image data and data of the printing quality maintenance pattern, and printing is performed based on the print data. The structure and characteristic of the print data at this time will be explained.

FIG. 3 illustrates a state in which print data is printed on a sheet. As shown in FIG. 3, before printing on a sheet, the layout of an image to be printed by the printing apparatus is generated. FIG. 3 shows an example of the image layout. The data is generated to print an image having an arrangement as shown in FIG. 3 as the layout of print data (to be described later).

In FIG. 3, reference numeral 301 denotes a sheet which is processed to print by using the engine control unit 208 of the printing apparatus and the like; 302, a laid-out image to be printed on the sheet 301 by the engine control unit 208; and 303, a printing quality maintenance pattern (to be referred to as a preliminary discharge pattern hereinafter). The image arrangement shown in FIG. 3 is merely an example, and the image layout is determined in the image processing unit 207 or the like. In the example of FIG. 3, an image is printed at an image size equal to the width of the sheet 301.

As shown in FIG. 3, each preliminary discharge pattern 303 is laid out between the images 302. Printing of the preliminary discharge pattern is processing performed to maintain the printing quality before printing the next image because it is unknown whether or not the nozzles of all the printheads are used to print the image 302. As is apparent from FIG. 3, the preliminary discharge pattern 303 is laid out between the images 302. By printing the preliminary discharge pattern 303 every time one image 302 is printed, the state of the printhead can be reset to print the next image 302 at high quality.

Reference numerals 304, 305, and 306 denote pixels using the same nozzle. The pixel 304 represents one pixel of the preliminary discharge pattern, and the pixels 305 and 306 represent pixels in respective images. This example assumes that the nozzle used to print the pixels 304, 305, and 306 is not used between the pixels 304, 305, and 306. In this case, this nozzle is not used between the pixels 305 and 306 except for printing of the pixel 304 by preliminary discharge. For this reason, the printing quality becomes higher in a case in which the nozzle is used once to print the pixel 304 in printing of the preliminary discharge pattern and then the pixel 306 is printed, compared to a case in which the nozzle is used to print the pixel 305 and then the pixel 306 is printed without printing the pixel 304.

When the distance between the pixels 305 and 306 is long enough to satisfactorily maintain the printing quality without printing the pixel 304, the pixel 304 need not be printed by the preliminary discharge pattern. Depending on the state of the image 302, no preliminary discharge pattern need be arranged between images. Specific examples and effects of these cases will be described below.

Figure 4A:
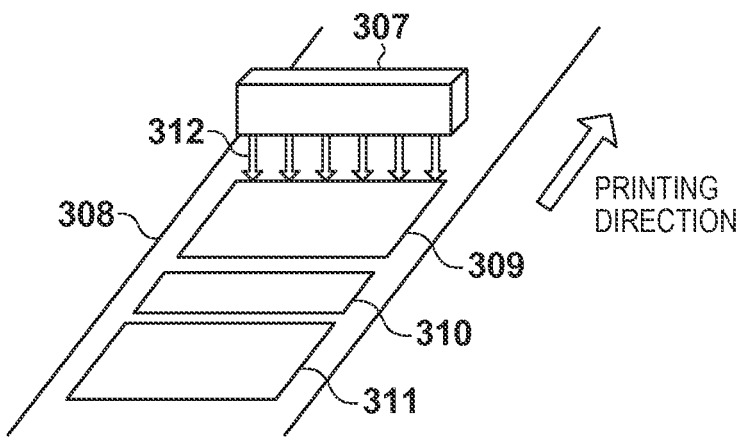
FIGS. 4A, 4B, and 4C are views each showing an example in which an image based print data described with reference to FIG. 3 is actually printed on a sheet.
Figure 4B:
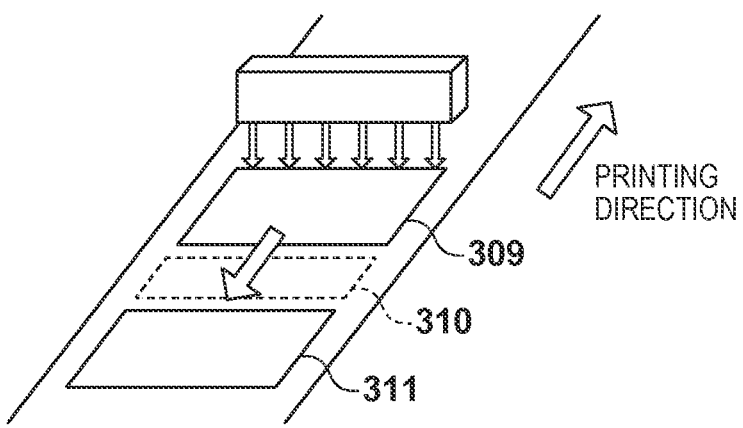
Figure 4C:
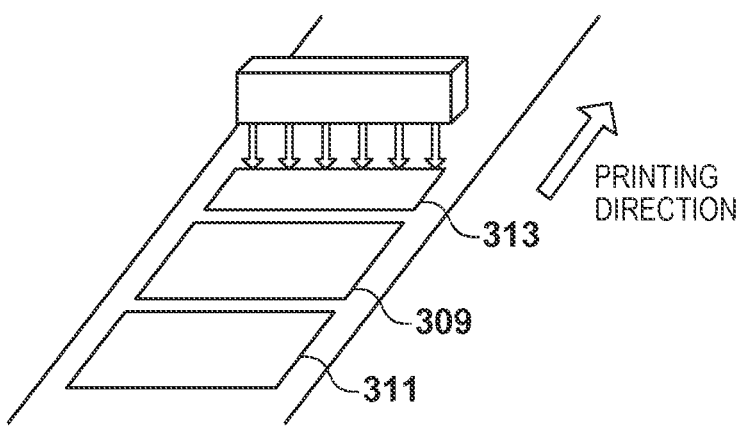

FIGS. 4A to 4C are views each showing an example in which the print data described with reference to FIG. 3 is actually printed on a sheet.

FIG. 4A shows a state in which images 309, 310, and 311 are printed by discharging ink 312 from a printhead 307 (corresponding to the head unit 105 in FIG. 1) to a sheet 308. In the state shown in FIG. 4A, the image 309 is printed by the discharged ink 312. From the relationship between FIG. 3 and FIGS. 4A to 4C, the images 309 and 311 correspond to the images 302, and the image 310 corresponds to the preliminary discharge pattern 303.

In this relationship, a case in which the preliminary discharge pattern 303 is not printed in FIG. 3 is equivalent to a case in which printing of the image 310 of the preliminary discharge pattern is skipped in FIG. 4A. That is, the image 309 is moved forward and printed next to the image 311, as shown in FIG. 4B. In the absence of the image 310 of the preliminary discharge pattern in FIG. 4A, printing of the image 309 has already ended, and printing advances to a next image 313, as shown in FIG. 4C.

Hence, as the number of preliminary discharge patterns decreases, the number of printable images increases and the number of images printed in the unit time also increases. In other words, reduction of the preliminary discharge pattern leads to a high printing throughput. Although the preliminary discharge pattern needs to be printed for higher image quality, this has a disadvantage in which the printing throughput decreases. It is therefore effective for a higher printing throughput to reduce printing of the preliminary discharge pattern in accordance with the situation.

<Print Processing>

1. General Outline

Figure 5:
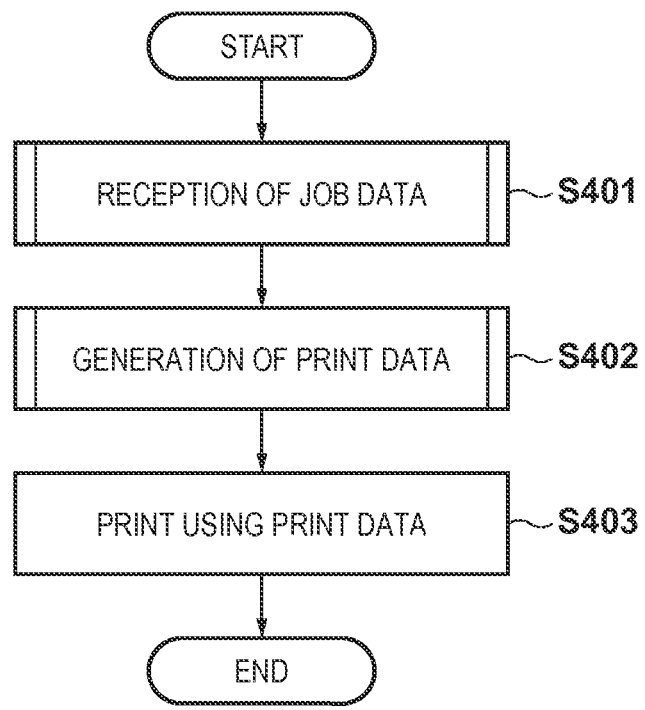
FIG. 5 is a flowchart showing an outline of print processing.

FIG. 5 is a flowchart showing an outline of print processing.

First, in step S401, the printing apparatus receives job data serving as print instruction data called a job from a connected PC or the like. Details of the job data reception will be explained later with reference to FIG. 6.

After receiving the job data, the printing apparatus generates print data in step S402. The attribute of the print job changes for each job. However, printing in this embodiment is printing on a continuous sheet, so it is necessary to rearrange image data of a job for printing on the continuous sheet, perform image processing, and then print. For this purpose, print data is generated based on the received job data. The preliminary discharge pattern shown in FIGS. 3 and 4A to 4C is arranged between images in the print data generation in step S402, details of which will be described later with reference to FIG. 7.

In step S403, the printing apparatus prints an image on the sheet based on the print data generated in step S402.

In this manner, the printing apparatus can continuously print a received job on a sheet.

2. Details of Job Data Reception

FIG. 6 is a flowchart showing detailed processing of job data reception in step S401 of FIG. 5.

First, in step S501, it is confirmed whether or not the printing apparatus can receive a job. If the printing apparatus cannot receive a job, the process waits until the printing apparatus can receive a job. If the printing apparatus can receive a job, it automatically starts job reception. Since job reception is passive to the printing apparatus, the job reception step is not shown in FIG. 6. However, the printing apparatus performs job reception at this timing.

Then, in step S502, it is confirmed whether or not reception of data of one job has ended. The process waits until reception of data of one job has ended, and after the end of receiving data of one job is confirmed, advances to step S503. In step S503, RIP processing is executed for the received data of one job. By the RIP processing, image data contained in the job undergoes image processing. Here, images in the job are divided into respective images, which are used to print on a continuous sheet.

The process then advances to step S504 to save corresponding image data in a temporary save area for each image in an order in which the sheet is printed using the image data having undergone RIP processing. In this embodiment, the HDD 204 is partitioned to set and use a dedicated area as the temporary save area. However, another method may be used as long as the same purpose can be achieved.

In step S505, whether or not a print start condition is satisfied is checked based on information of the image data group saved in the temporary save area in step S504. In this embodiment, it is determined that the print start condition is satisfied when image data equivalent to the length of a prepared continuous sheet is saved in the temporary save area. However, if the print start condition is satisfied, as shown in this flowchart, the condition is not limited to this. If it is determined that the print start condition is not satisfied yet, the process returns to step S502. If it is determined that the print start condition is satisfied, the process ends.

After that, the process advances to the processing in step S402 shown in FIG. 5.

3. Details of Print Data Generation

FIG. 7 is a flowchart showing detailed processing of print data generation in step S402 of FIG. 5. As described with reference to FIG. 6, image data for printing is saved in the temporary save area. When the saved data amount satisfies the print start condition, the following processing is executed to generate print data.

First, in step S601, the number N of an image is initialized to be N=1. Then, in step S602, image data representing the Nth image in the temporary save area is added as print data. This addition means separately setting a save area and adding the print data to it. The print data is a data group assuming that the data are simply used for printing. After the image data representing the Nth image is added to the print data in step S602, the process advances to step S603 to confirm whether or not the preliminary discharge pattern is necessary after the image N.

The condition in this condition determination will be explained in detail later with reference to FIG. 8 or 12. If it is determined based on the condition shown in FIG. 8 or 12 that the preliminary discharge pattern needs to be printed, the process advances to step S604. In step S604, the preliminary discharge pattern is added to the print data. Addition of the preliminary discharge pattern will be explained in detail later with reference to FIG. 17.

In step S604, after image data corresponding to the image N is added to the print data, data of the preliminary discharge pattern is added in accordance with the result. After the addition, the process advances to step S605. If it is determined in step S603 that no preliminary discharge pattern need be printed, the process simply advances to step S605. In step S605, a status on image data corresponding to the Nth image among image data saved in the temporary save area is changed to "processed". Information "before printing" or "processed" is added to image data saved in the temporary save area. This information is changed to "processed", representing that the image data has been used in print data.

In step S606, it is confirmed whether or not image data whose status is not "processed" exists among image data in the temporary save area. If image data "before processing" does not exist in the temporary save area, the process ends. If image data "before processing" exists, the process advances to step S607 to increment the N value by one, and returns to step S602.

In this fashion, image data saved in the temporary save area can be arranged in the print data, including the preliminary discharge pattern.

4. Determination of Whether Preliminary Discharge is Necessary/Unnecessary (1) Case in which One Image is Printed in Widthwise Direction of Sheet FIG. 8 is a flowchart showing processing of performing condition determination of whether printing of a discharge pattern for maintaining the image quality is necessary or unnecessary when printing each image. This flowchart shows details of the processing of determining the condition to determine in step S603 of FIG. 7 whether or not preliminary discharge is necessary. In this description, N indicates the same image order as one mentioned in FIG. 7.

First, in step S701, it is checked whether or not a condition that the printing widths of the Nth and (N−1)th images are equal to each other and also equal to the sheet width is satisfied.

Figure 9A:
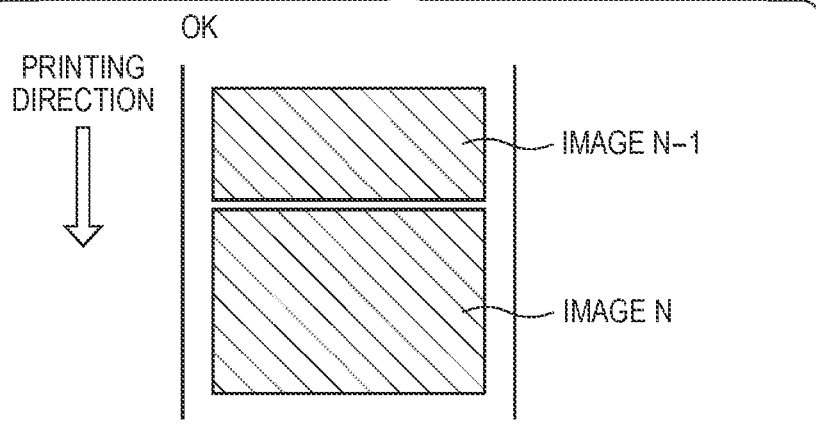
FIGS. 9A, 9B, and 9C are views each showing a particular relationship between the printing widths of the Nth image (image N) and (N−1)th image (image N−1) and the sheet width.
Figure 9B:
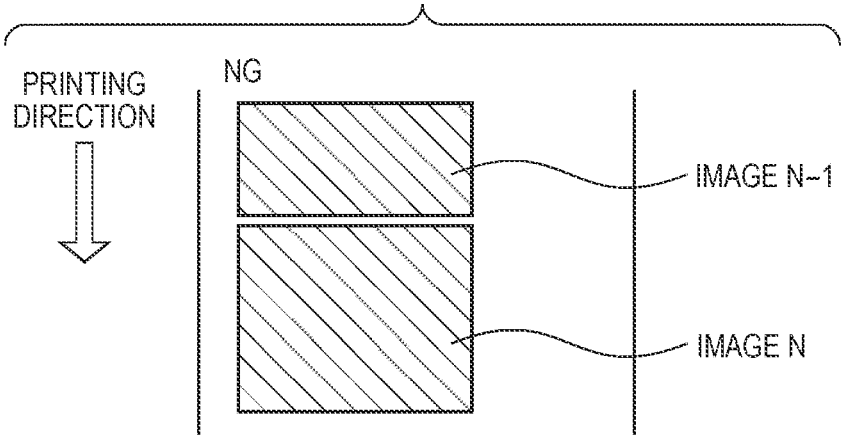
Figure 9C:
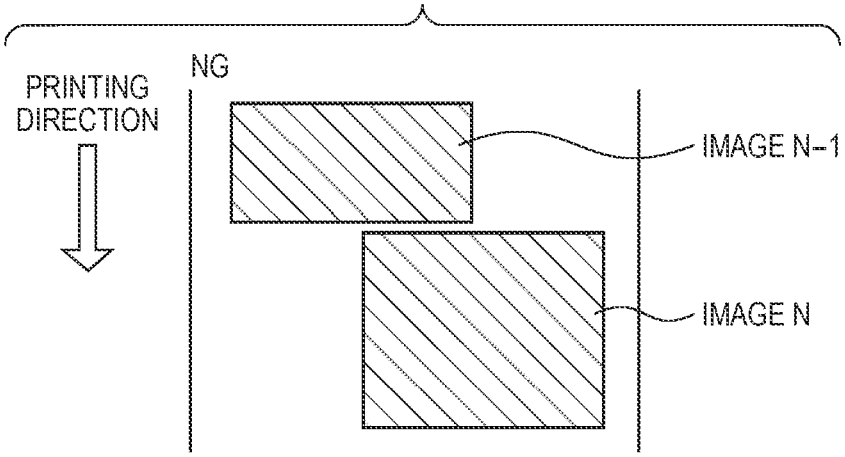

FIGS. 9A to 9C are views each showing a particular relationship between the printing widths of the Nth image (image N) and (N−1)th image (image N−1) and the sheet width.

FIG. 9A shows an example in which the printing widths of the Nth and (N−1)th images are equal to each other and also equal to the sheet width in a direction perpendicular to the printing direction. However, as is apparent from FIG. 9A, there is a small gap between the printing width of the image and the sheet width. In many cases, printing is performed by giving a small margin to the sheet width in practice, and then the sheet is cut by a cutter or the like. For this reason, even if there is a margin actually, it is determined that the printing width and sheet width are considered to be equal.

The description of the sheet width and the printing width of the image will be continued.

When an image having a width smaller than the sheet width is printed, as shown in FIGS. 9B and 9C, the condition in step S701 is not satisfied. In this case, the process advances to step S705 to save information "a partial preliminary discharge pattern needs to be printed after the image N". Note that the partial preliminary discharge pattern will be described later. This information will be mentioned again in the description of a flowchart shown in FIG. 16.

If the condition in step S701 is satisfied, the process advances to step S702 to check whether or not the printhead has been used to print the (N−1)th image before printing the Nth image, to a degree at which no preliminary discharge pattern is necessary. If this condition is satisfied, the process advances to step S703 to save information "preliminary discharge is unnecessary after printing the image N". If the condition in step S702 is not satisfied, the process advances to step S704 to save information "a normal preliminary discharge pattern is necessary after printing the image N".

More specifically, for example, in step S702, the time during which each nozzle has not been used can be measured based on generated print data. If the unused time exceeds a predetermined value, it can be determined that the condition is satisfied. Note that whether the preliminary discharge pattern is necessary or unnecessary is determined in step S603 of FIG. 7 based on the information saved in one of steps S703, S704, and S705.

If it is determined that the normal preliminary discharge pattern or partial preliminary discharge pattern needs to be printed, it is determined in step S603 that the preliminary discharge pattern needs to be printed.

Figure 10:
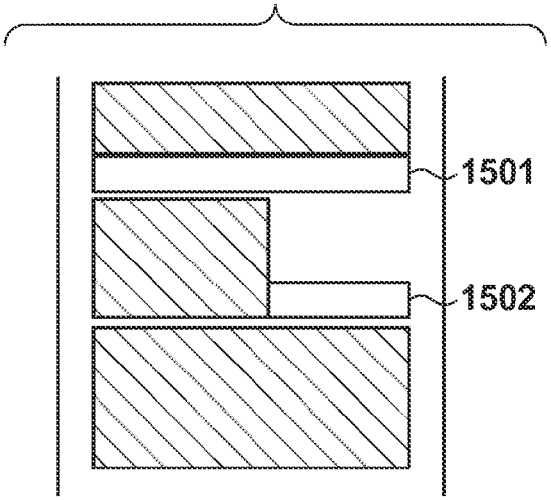
FIG. 10 is a view showing a normal preliminary discharge pattern and partial preliminary discharge pattern.

FIG. 10 is a view showing the normal preliminary discharge pattern and partial preliminary discharge pattern.

As shown in FIG. 10, a normal preliminary discharge pattern 1501 is a preliminary discharge pattern equal in width to a sheet, and preliminary discharge is performed using all the nozzles of a corresponding portion. Note that the preliminary discharge pattern shown in FIG. 3 is also a normal preliminary discharge pattern. To the contrary, a partial preliminary discharge pattern 1502 is a pattern for printing a preliminary discharge pattern in a non-printing area beside a printed image, and preliminary discharge is performed using all corresponding nozzles. The partial preliminary discharge pattern 1502 is printed to be connected to an image. In printing on a sheet, as in the embodiment, the four sides of an image are actually cut by a cutter, so no problem arises even if the image and preliminary discharge pattern are connected to each other.

Figure 11:
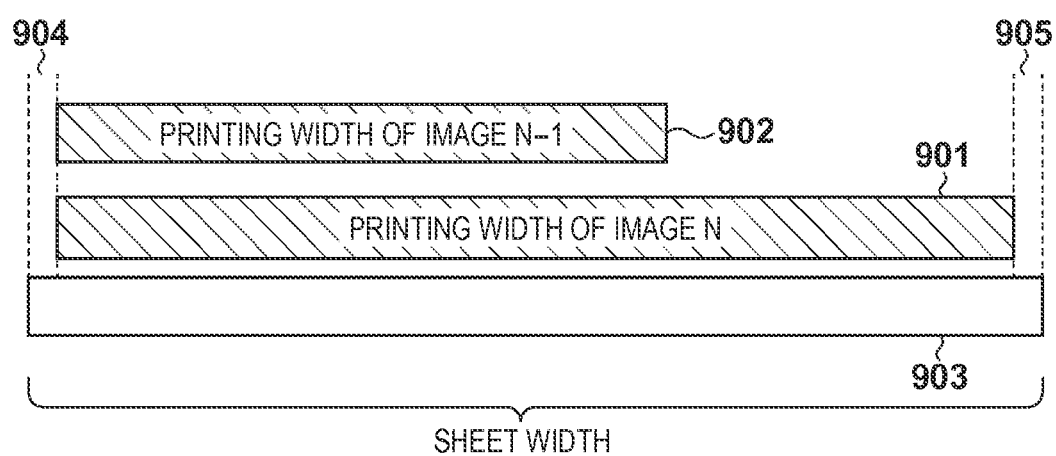
FIG. 11 is a view exemplifying a particular relationship between the sheet width and the printing width of an image.

FIG. 11 is a view exemplifying a particular relationship between the sheet width and the printing width of an image. In FIG. 11, reference numeral 901 denotes a printing width of the image N; 902, a printing width of the image N−1; 903, a width of a sheet used in printing; and 904 and 905, margins, respectively.

Although the condition "are the sheet width and printing width equal?" is determined in step S701 of FIG. 8, the margins 904 and 905 exist between the sheet width and the printing width of the image N in practice, as shown in FIG. 11. This is because, in actual printing, the sheet width and the printing width of the image N are considered to be equal, including these margins, and printing is performed. Upon printing on a sheet, the actual image N is cut out by cutting the margin using a cutter or the like after printing. Therefore, a condition including a margin such as the one shown in FIG. 11 is sometimes set in condition determination of whether or not the sheet width and the printing width of the image N are equal, as represented in step S701. If a margin is excessively large, like a margin for the printing width 902 of the image N−1, the sheet width and the printing width of the image are considered to be different.

Figure 12:
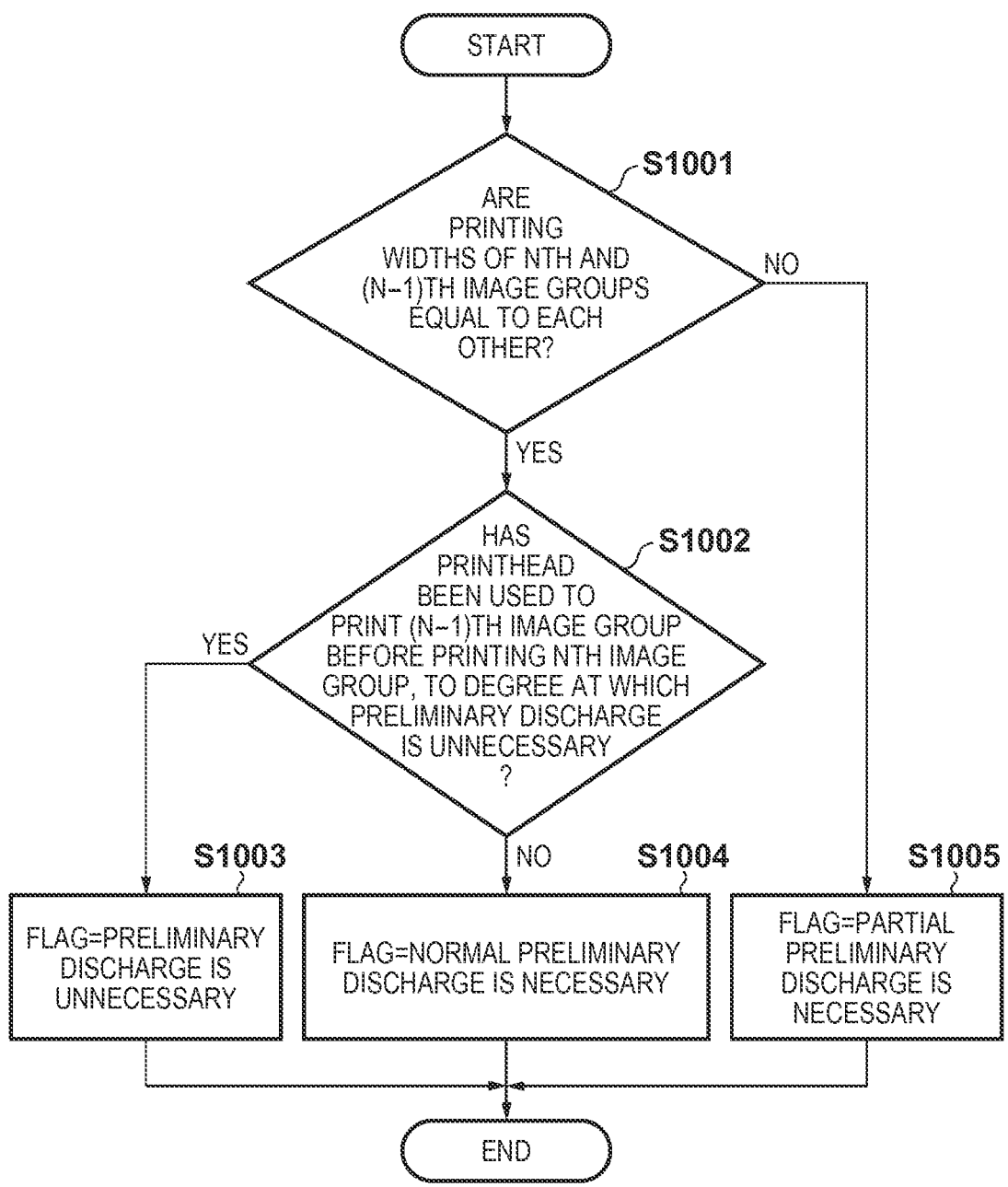
FIG. 12 is a flowchart showing processing of performing condition determination of whether printing of a discharge pattern for maintaining the image quality is necessary or unnecessary when printing a plurality of images.

(2) Case in which Plurality of Images are Printed in Widthwise Direction of Sheet FIG. 12 is a flowchart showing processing of performing condition determination of whether printing of a discharge pattern for maintaining the image quality is necessary or unnecessary when printing a plurality of images. This processing is basically the same as that described with reference to FIG. 8. A difference from the processing shown in FIG. 8 is that a plurality of images are arranged in a direction perpendicular to the printing direction. These images will be defined as an image group.

Figure 13:
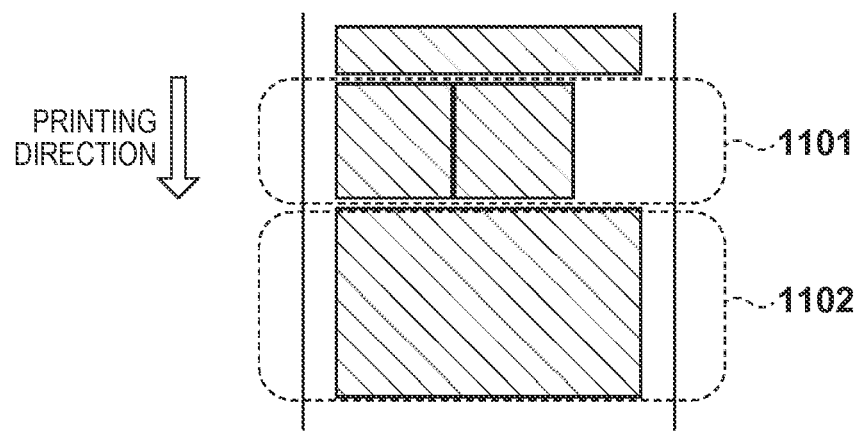
FIG. 13 is a view showing a specific example of an image group.

FIG. 13 is a view showing a specific example of the image group.

In FIG. 13, reference numerals 1101 and 1102 denote image groups. For example, the image group 1101 is defined as an image group N−1, and the image group 1102 is defined as an image group N. FIG. 12 shows processing of determining whether the preliminary discharge pattern is necessary or unnecessary when a plurality of images are arranged in a direction perpendicular to the printing direction.

First, in step S1001, it is checked whether or not the printing widths of the Nth and (N−1)th image groups are equal to each other and also equal to the sheet width.

Figure 14A:
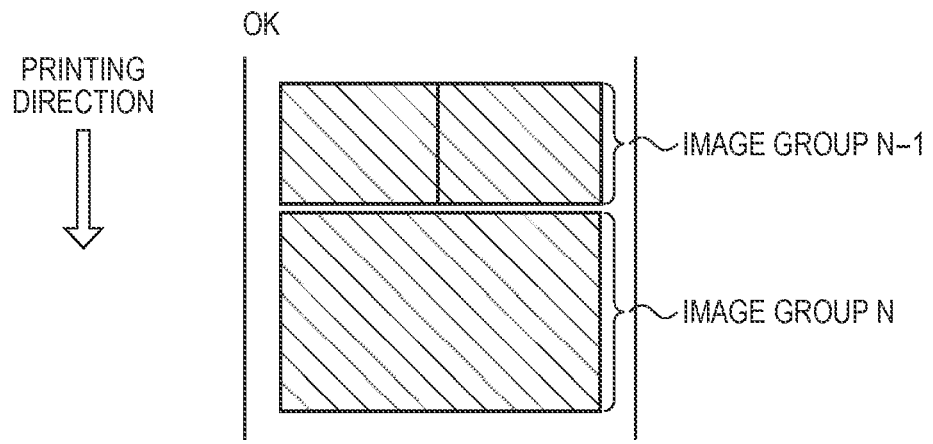
FIGS. 14A, 14B, and 14C are views each showing a particular relationship between the printing widths of the Nth image group (image group N) and (N−1)th image group (image group N−1) and the sheet width.
Figure 14B:
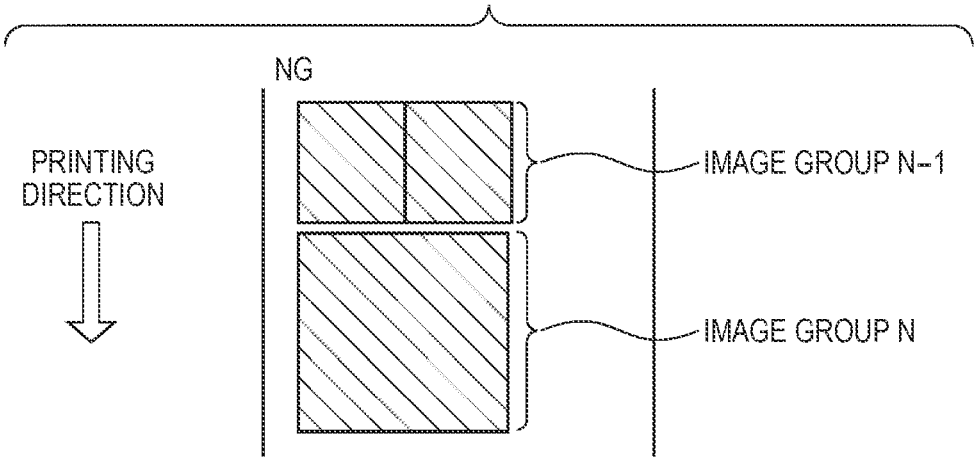
Figure 14C:
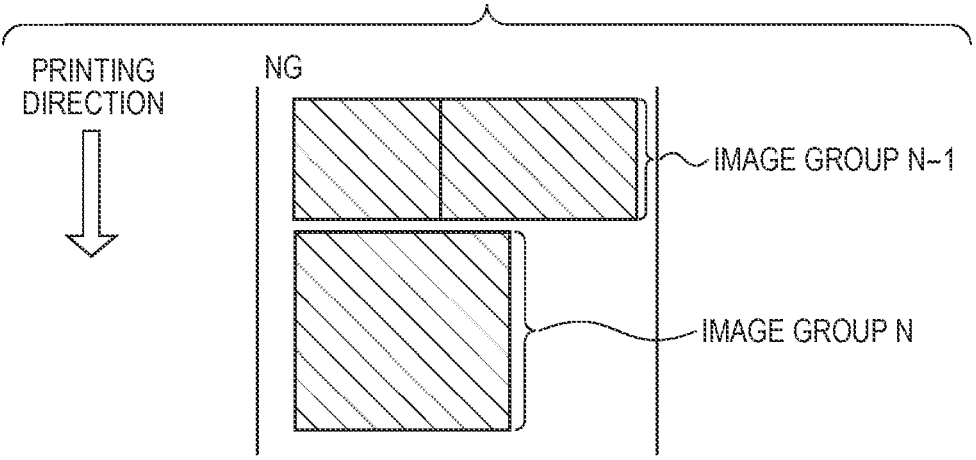

FIGS. 14A to 14C are views each showing a particular relationship between the printing widths of the Nth image group (image group N) and (N−1)th image group (image group N−1) and the sheet width.

FIG. 14A shows an example in which the printing widths of the Nth image group (image group N) and (N−1)th image group (image group N−1) are equal to each other and also equal to the sheet width in a direction perpendicular to the printing direction. However, as is apparent from FIG. 14A, there is a gap between the image group and the sheet.

In practice, a plurality of images are arranged, as shown in FIG. 13. In many cases, printing is performed by giving a small margin between images, and then the sheet is cut by a cutter or the like. For this reason, even if there is a margin actually, width calculation is executed, including the margin. Even if there is a margin actually, it is determined that the printing width and sheet width are considered to be equal.

The description of the sheet width and the printing width of the image will be continued.

When an image group shorter than the sheet width is printed, as shown in FIGS. 14B and 14C, the condition in step S1001 is not satisfied. In this case, the process advances to step S1005 to save information "the partial preliminary discharge pattern needs to be printed after printing the image group N". This information will be mentioned again in the description of a flowchart shown in FIG. 16.

If the condition in step S1001 is satisfied, the process advances to step S1002 to check whether or not the printhead has been used to print the (N−1)th image group before printing the Nth image group, to a degree at which no preliminary discharge pattern is necessary.

If it is determined that this condition is satisfied, the process advances to step S1003 to save information "no preliminary discharge pattern need be printed after printing the image group N". If it is determined that the condition in step S1002 is not satisfied, the process advances to step S1004 to save information "the normal preliminary discharge pattern is necessary after printing the image group N".

Whether the preliminary discharge pattern is necessary or unnecessary is determined in step S603 of FIG. 7 based on the information saved in one of steps S1003, S1004, and S1005. If it is determined that the normal preliminary discharge pattern or partial preliminary discharge pattern is necessary, it is determined in step S603 that printing of the preliminary discharge pattern is necessary.

Figure 15:
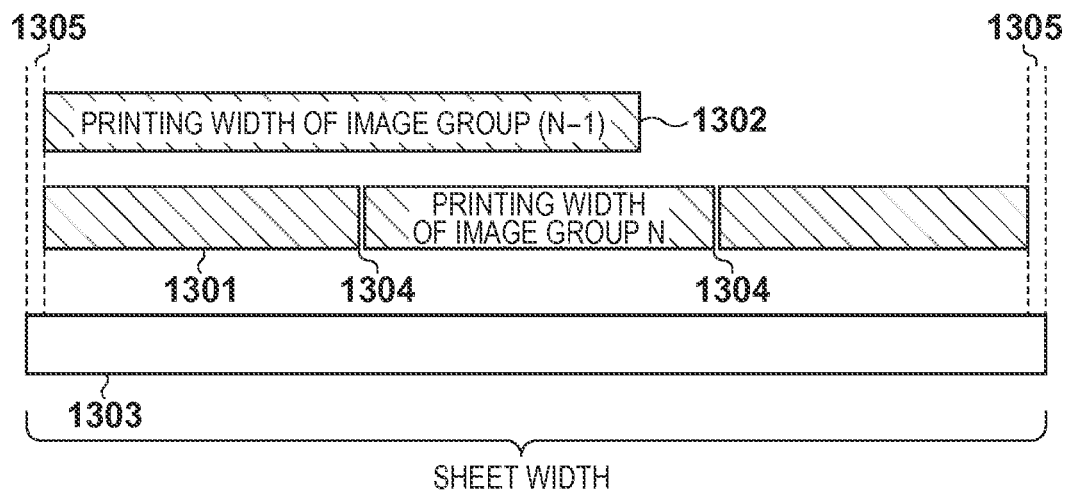
FIG. 15 is a view exemplifying a particular relationship between the sheet width and the printing width of an image group.

FIG. 15 is a view exemplifying a particular relationship between the sheet width and the printing width of an image group. In FIG. 15, reference numeral 1301 denotes a printing width of an image forming the image group N; 1302, a printing width of an image forming the image group N−1; 1303, a width of a sheet used in printing; and 1304 and 1305, margins, respectively.

Although the condition "are the sheet width and the printing width of an image group equal?" is determined in step S1001 of FIG. 12, the margins 1304 and 1305 exist between the sheet width and the printing width of the image group N in practice, as shown in FIG. 15. This is because, in actual printing, the sheet width and the printing width of the image group N are considered to be equal, including these margins, and printing is performed. Upon printing on a sheet, the actual image group N is cut out by cutting the margin using a cutter or the like after printing. Further, the image group N is cut out into respective images. Hence, a condition including a margin as shown in FIG. 15 is sometimes set in condition determination of whether or not the sheet width and the printing width of the image group N are equal, as represented in step S1001. If a margin is excessively large, like a margin for the printing width 1302 of the image group N−1, the sheet width and the printing width of the image are considered to be different.

(3) Determination of Preliminary Discharge Type

Figure 16:
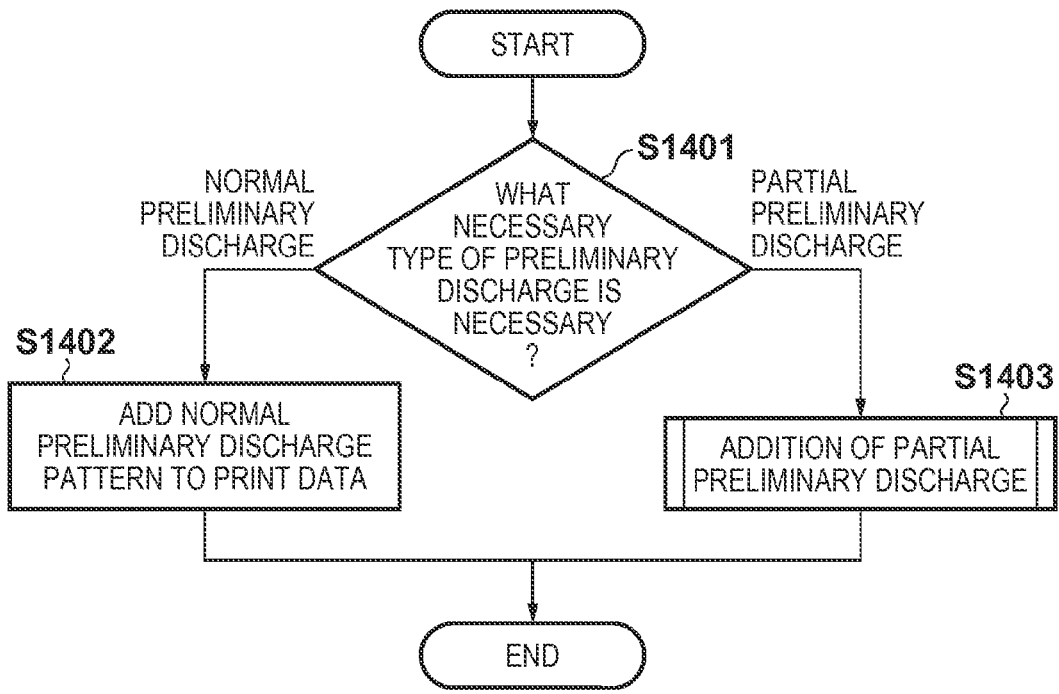
FIG. 16 is a flowchart showing processing of determining a necessary type of preliminary discharge.

FIG. 16 is a flowchart showing processing of determining a necessary type of preliminary discharge. This processing is a detailed description of step S604 in FIG. 7, as described above.

First, in step S1401, a necessary type of preliminary discharge is checked. This determination is made based on information which is saved in accordance with the processing of the flowchart shown in FIG. 8 or 12 and represents which of the normal preliminary discharge pattern and partial preliminary discharge pattern is necessary.

If it is determined in step S1401 that the normal preliminary discharge pattern needs to be printed, the process advances to step S1402 to add data of the normal preliminary discharge pattern to image data corresponding to the image N (image group N) in print data.

If it is determined in step S1401 that the partial preliminary discharge pattern needs to be printed, the process advances to step S1403 to add the partial preliminary discharge pattern to print data.

Note that detailed processing of partial preliminary discharge pattern addition will be described later with reference to FIG. 17. In this fashion, print data in which data of the preliminary discharge pattern is added after image data corresponding to the image N (image group N) is generated.

Figure 17:
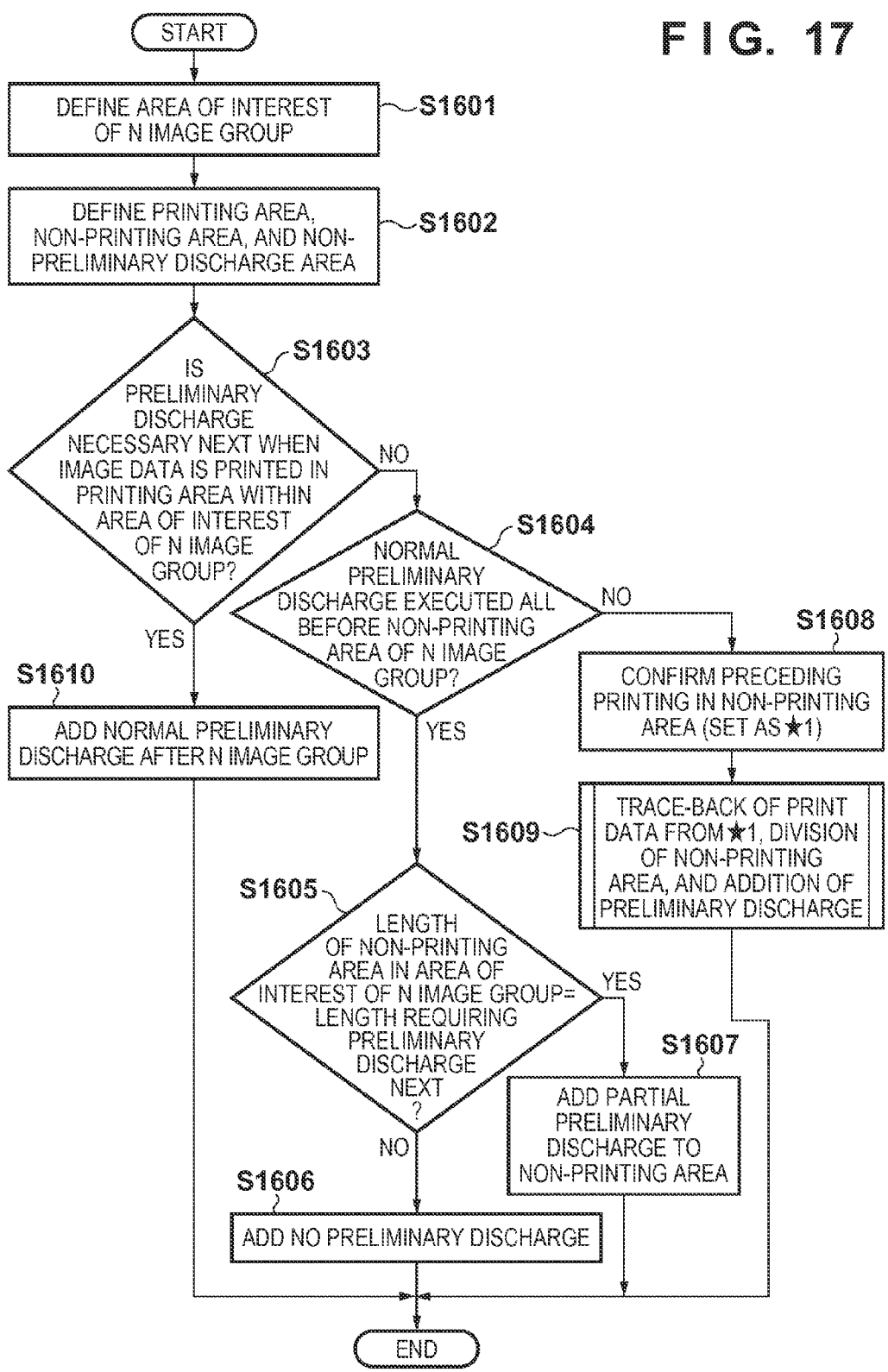
FIG. 17 is a flowchart showing processing of determining an image quality maintenance pattern to be printed between images.

FIG. 17 is a flowchart showing processing of determining what image quality maintenance pattern to be printed between images. This processing is a detailed description of step S1403 in FIG. 16. Data of the preliminary discharge pattern is added to print data according to this processing. In this description, N indicates the same image order as the one used in FIG. 7. In this case, an image group as shown in FIG. 13 will be exemplified. Even for one image, this image is regarded as an image group, and the same processing is executed.

First, in step S1601, the area of interest of the image group N is defined.

FIGS. 18A to 18H are views showing specific examples of the area of interest. An image group contained in a portion defined as the area of interest is the image group N. In other words, an area where the image group N is arranged serves as an area of interest defined here.

FIGS. 18A to 18H also show specific examples of the arrangement of the image quality maintenance pattern with respect to an image.

Then, in step S1602, a printing area and non-printing area are defined in the area of interest of a sheet. Specific examples are illustrated in FIGS. 18A to 18H. For example, in FIG. 18A, a printing area and non-printing area are defined based on whether or not an image to be printed exists in an area 1701 of interest surrounded by a broken line. This also applies to the subsequent drawings. That is, in the area of interest defined first, an area where an image is printed is defined as a printing area, and an area where no image is printed is defined as a non-printing area.

Figure 18A:
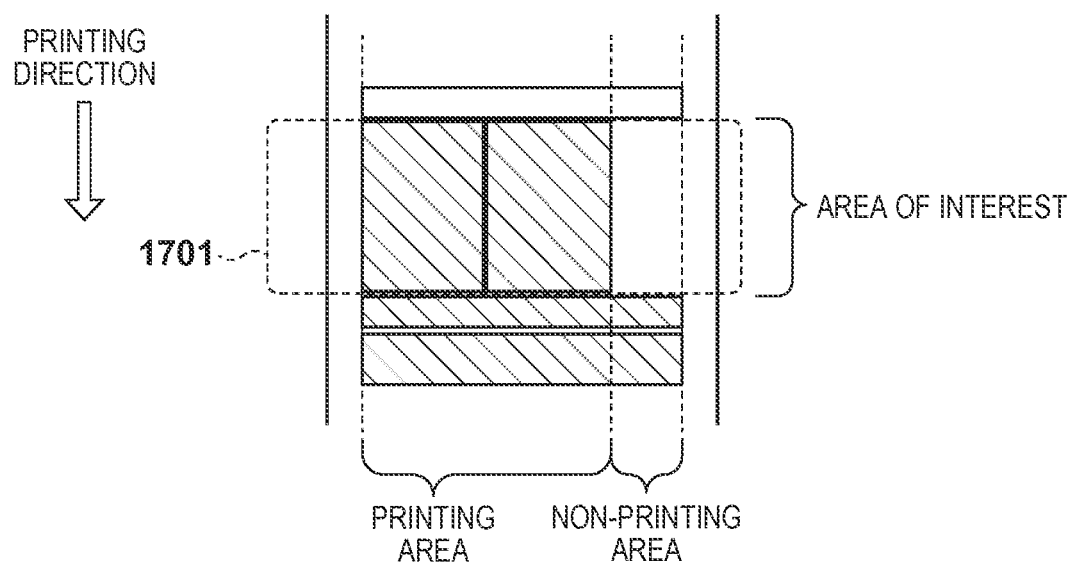
Figure 18B:
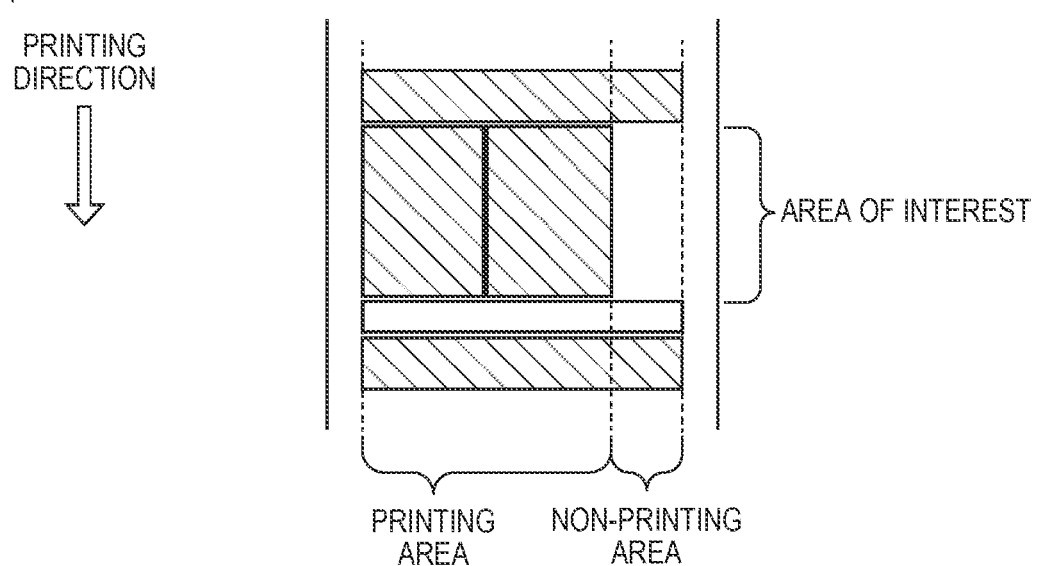
Figure 18E:
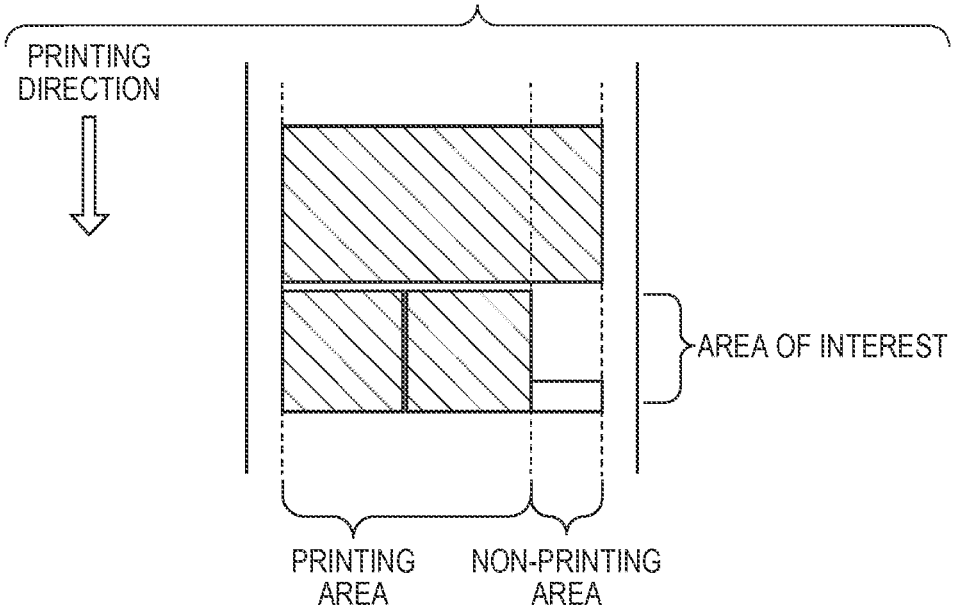
Figure 18F:
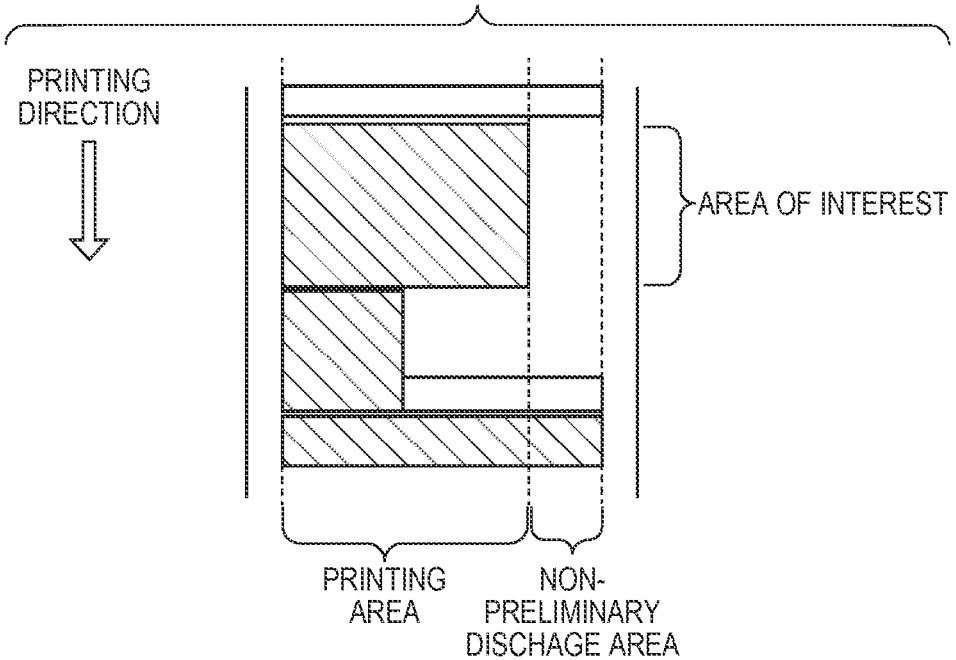
Figure 18G:
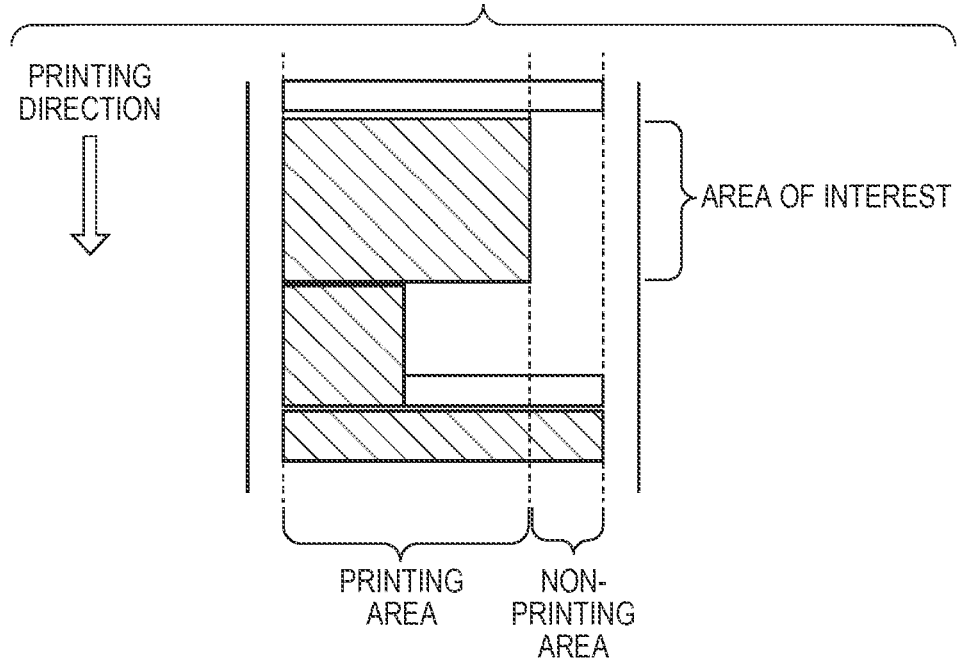
Figure 18H:
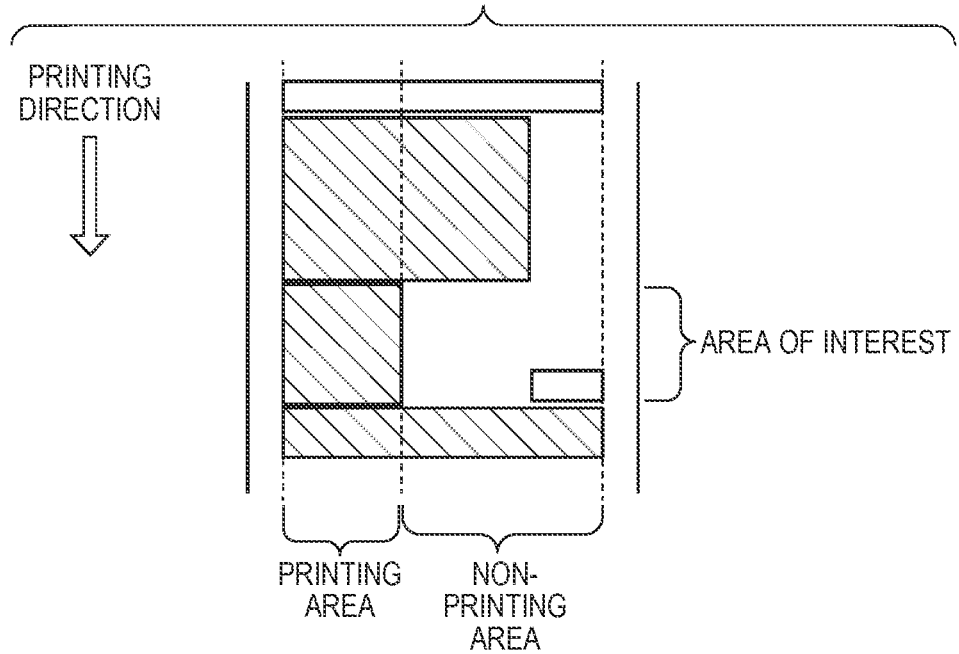

FIG. 18B shows a case in which no preliminary discharge pattern exists before the area of interest. FIG. 18C shows a state in which part of the non-printing area serves as a partial preliminary discharge pattern. Similarly, FIGS. 18D to 18H show specific examples of printing and non-printing areas with respect to the area of interest.

In FIGS. 18A to 18H, each hatched rectangular area represents an image obtained by receiving a print job and performing image processing. Each blank rectangular area represents a preliminary discharge pattern. In step S1602, printing and non-printing areas are defined. In the examples of FIGS. 18A to 18H, one non-printing area and one printing area exist. However, a plurality of non-printing areas and a plurality of printing areas may exist.

As for the non-printing area, an area necessary for the user though no printing is actually done, such as the border of a photograph, the page portion of an album, or the edge portion of a calendar, is defined as a printing area. Even in a printing area, an area which is actually discarded, such as printer's marks, can be regarded as a non-printing area.

FIG. 19 is a view exemplifying an operation screen used for condition setting of the printing area. As shown in FIG. 19, the conditions of the printing and non-printing areas can be set in the apparatus.

In step S1603, it is checked whether or not printing of the preliminary discharge pattern is necessary next when an image is printed in the printing area within the area of interest of the image group N. This indicates a case in which image data of the image group N is analyzed, and after printing the image group N, the image quality cannot be maintained without the preliminary discharge pattern. Examples are a case in which an image is very long parallelly in the printing direction, and a case in which an image itself is almost blank and many nozzles are not used for a long time.

As described above, since the image quality may not be maintained when nozzles are not used for a long time (do not discharge ink) in inkjet printing, the preliminary discharge pattern is inserted between images. For this reason, if it is determined that the preliminary discharge pattern needs to be printed after the printing area, the process advances to step S1610 to add the normal preliminary discharge pattern after printing the image group N. FIG. 18A shows a specific example of this case in which the normal preliminary discharge pattern is added after the area of interest.

In contrast, if it is determined in step S1603 that only printing of image data of the image group N in the printing area is sufficient for maintaining the image quality and no preliminary discharge pattern need be printed, the process advances to step S1604.

In step S1604, it is confirmed whether or not the preliminary discharge pattern has been printed before the non-printing area of the image group N. In the example of FIG. 18A, a blank rectangle is arranged at a portion above the non-printing area in the area of interest. This represents the normal preliminary discharge pattern. The printing direction in FIG. 18A is a direction from the top to the bottom. In FIG. 18A, therefore, it is determined that the preliminary discharge pattern has been printed before the non-printing area (YES in step S1604). To the contrary, if a portion above the non-printing area in the area of interest has an image, as shown in FIG. 18B, it is determined that no preliminary discharge pattern has been printed (NO in step S1604).

If it is determined in step S1604 that the preliminary discharge pattern has been printed, the process advances to step S1605.

In step S1605, it is checked whether or not the length of the non-printing area in the area of interest of the image group N is a length requiring the preliminary discharge pattern next. As described above, when the nozzles are not used for a predetermined period, the image quality cannot be maintained. The non-printing area is an area where printing is possible but there is no image data for printing. Thus, when the nozzles pass this area, all of them are not used. If the non-printing area lasts long, the nozzles are not used for a long time, so the pattern needs to be printed to maintain the image quality in next printing. In this case, it is checked whether or not the length of the non-printing area requires printing of the preliminary discharge pattern in next printing to maintain the image quality. If it is determined that no preliminary discharge pattern need be printed, the process advances to step S1606 to determine that preliminary discharge is unnecessary, and the process ends.

If it is determined in step S1605 that the preliminary discharge pattern needs to be printed, the process advances to step S1607 to print the partial preliminary discharge pattern in the non-printing area. For example, the preliminary discharge pattern is arranged near the end of the non-printing area in the non-printing area of the area of interest not to hinder the next image printing, as represented by the partial preliminary discharge pattern 1502 in FIG. 10. In this manner, images can be printed by minimizing the width of the margin between them without disturbing the margin by the preliminary discharge pattern. This contributes to an increase in printing throughput.

If it is determined in step S1604 that no preliminary discharge pattern has been printed, the process advances to step S1608 to confirm the preceding printing contents of the non-printing area in the non-printing area. For example, in FIG. 18D, the normal preliminary discharge pattern is printed before the non-printing area in the area of interest in the printing direction. Further, an image is printed before the normal preliminary discharge pattern. To confirm what has been printed before the non-printing area, what exists needs to be confirmed before the start position of the non-printing area.

For this purpose, in step S1609, print data before the print start position of the image group N is traced back to divide the non-printing area, and data of the preliminary discharge pattern is added. That is, the non-printing area in the area of interest is divided in accordance with the data confirmed in step S1608. For each divided area, it is checked whether printing of the preliminary discharge pattern is necessary or unnecessary. Then, data of the partial preliminary discharge pattern is added.

FIG. 20 is a flowchart showing detailed processing in step S1609, that is, processing of deciding the arrangement of the image quality maintenance pattern in the non-printing area.

Figure 21A:
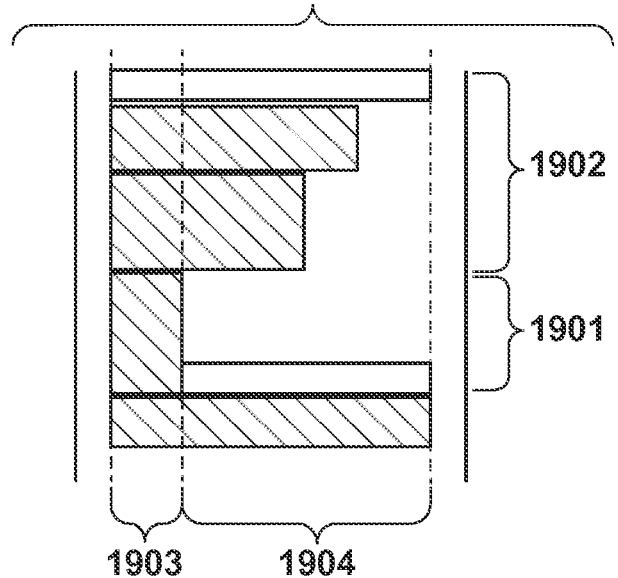
FIGS. 21A and 21B are views showing a state in which there are a plurality of printing states in a direction perpendicular to the printing direction in the non-printing area of the area of interest.
Figure 21B:
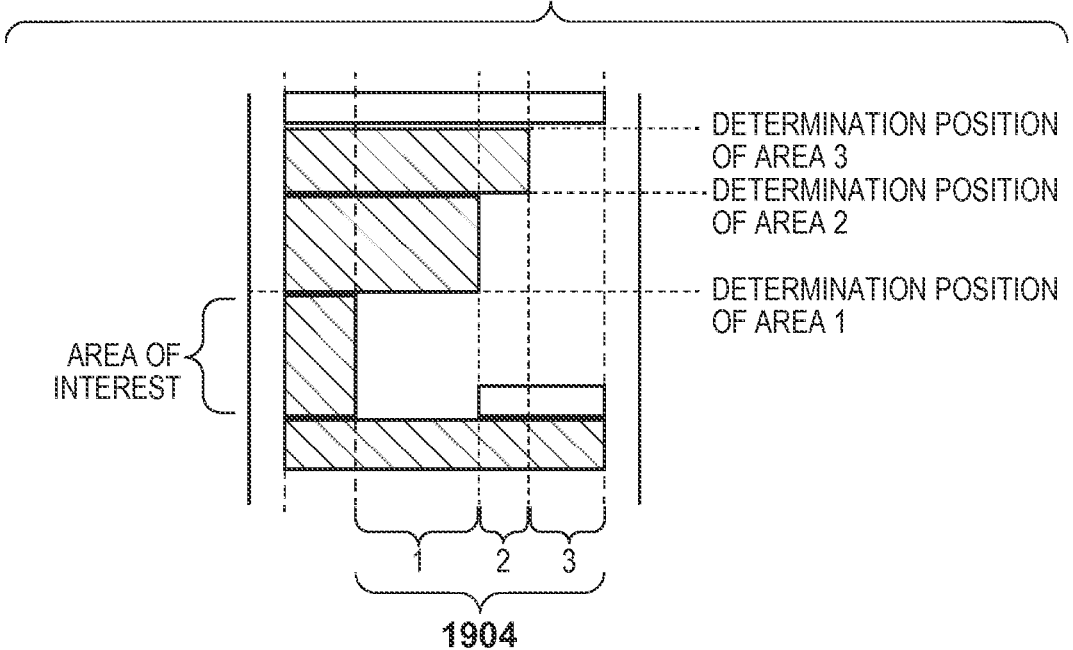

FIGS. 21A and 21B are views showing a state in which there are a plurality of printing states in a direction perpendicular to the printing direction in the non-printing area of the area of interest. FIG. 21A shows a case in which when an image is confirmed by checking image data for a non-printing area 1904 in the area of interest in step S1608, a plurality of states are detected in a direction perpendicular to the printing direction. FIG. 21A also shows a confirmation area 1903.

The purpose of this processing is to prevent waste of ink by arranging the partial preliminary discharge pattern in the non-printing area and printing the preliminary discharge pattern in only a necessary area. By executing the processing in accordance with the flowchart shown FIG. 20, the type of image quality maintenance pattern to be used between images is decided.

In step S1801, preceding print data in the non-printing area is confirmed. This means confirming print data printed before the non-printing area of the image group N, as described with reference to FIG. 17. Referring to FIG. 21A, when the area to be confirmed in the area 1901 of interest is the confirmation area 1902, what print data exists in this confirmation area is confirmed.

Then, in step S1802, the non-printing area is divided for each print data such as an image or preliminary discharge pattern. FIG. 21B shows an example in which the non-print area 1904 shown in FIG. 21A is divided. As shown in FIG. 21B, the non-printing area 1904 is divided into three areas 1 to 3. As is apparent from the example of FIG. 21A, two images and one preliminary discharge pattern exist in the confirmation area 1902. In step S1802, division processing is performed in accordance with the boundaries of the images and preliminary discharge pattern, so division into three areas is performed. This is because the use of the nozzles greatly changes at each division boundary.

In non-printing area 1, an image is printed immediately before the area of interest. However, in non-printing area 3, the preliminary discharge pattern is printed far before the area of interest, and printing has not been executed thereafter. For this reason, non-printing area 3 is most likely to require the preliminary discharge pattern, compared to non-printing area 1. For each divided non-printing area, whether or not the preliminary discharge pattern is necessary is determined. The division count is defined as Mmax.

Referring back to FIG. 20, in step S1803, a parameter M representing a divided non-printing area is initialized to M=1.

The process then advances to step S1804 to confirm whether or not a length from the end of the non-printing area M of the image group N to an area where printing was performed based on preceding print data is a length requiring printing of the preliminary discharge pattern next. If it is determined that the preliminary discharge pattern needs to be printed, the process advances to step S1806 to add, by the width of the non-printing area M, data of the partial preliminary discharge pattern to a position before the next image comes at the end of the non-printing area M. Thereafter, the process advances to step S1807. If it is determined that no preliminary discharge pattern need be printed, the process advances to step S1805 to determine that data of the partial preliminary discharge pattern is not added to the non-printing area M. Then, the process advances to step S1807.

In step S1807, the value of the parameter M is incremented by one. In step S1808, it is checked whether or not M>Mmax. If M≤Mmax, it is determined that whether or not the partial preliminary discharge pattern is necessary has not been determined for all the divided regions of the non-printing area yet. Thus, the process returns to step S1804 to check whether or not the preliminary discharge pattern needs to be printed for the next non-printing area. If M>Mmax, it is determined that the confirmation has ended for all the divided non-printing areas, and the process ends.

According to the above-described embodiment, when printing is performed on a continuous sheet, it is controlled to make the width of the sheet used in printing and that of an image as equal as possible. As a result, the states of all the nozzles of the full-line printhead can be maintained satisfactorily. Even when a plurality of images having different image widths are printed on a sheet by using the full-line printhead, printing of the image quality maintenance pattern is minimized. Thus, the throughput is increased, and the image quality can be maintained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-229239, filed Oct. 16, 2012, which is hereby incorporated by reference herein in its entirety.

What is claimed is:

1. A printing apparatus which prints a plurality of images by discharging ink to a sheet by using a full-line printhead while conveying the sheet, comprising:
   an input unit configured to input image data from a host apparatus;
   a determination unit configured to analyze, from the image data input by said input unit, a size of an image and a position of the sheet where the image is printed, and determine what type of preliminary discharge is necessary in accordance with a result of the analysis;
   a generation unit configured to generate print data to be used by the full-line printhead by adding, to the image data, data for preliminary discharge complying with the type of preliminary discharge determined by said determination unit; and
   a control unit configured to control to print by the full-line printhead based on the print data generated by said generation unit,
   wherein the preliminary discharge includes:
      normal preliminary discharge which is performed between a plurality of images to be printed in a conveyance direction of the sheet by using all nozzles of the full-line printhead, and
      partial preliminary discharge which is performed by using some nozzles of the full-line printhead in a marginal area where the image is not printed in a widthwise direction of the sheet in a case where a width of an image to be printed in the widthwise direction of the sheet is smaller than a width of the sheet,
   said determination unit determines which of the normal preliminary discharge and the partial preliminary discharge is necessary, and
   said determination unit divides the marginal area into a plurality of divided areas based on print data used to print before the marginal area in the conveyance direction of the sheet, and determines, for each divided area, whether or not partial preliminary discharge is necessary.

2. The apparatus according to claim 1, wherein the plurality of images are printed at different positions in a conveyance direction of the sheet and a widthwise direction of the sheet perpendicular to the conveyance direction of the sheet, and the plurality of images have sizes different in the widthwise direction of the sheet.

3. The apparatus according to claim 1, wherein in a case where one image is printed in the widthwise direction of the sheet, said determination unit performs the determination for each of the plurality of images, and
   in a case where a plurality of images are printed in the widthwise direction of the sheet, said determination unit regards the plurality of images in the widthwise direction of the sheet as one group, and performs the determination for each group.

4. The apparatus according to claim 3, wherein in a case where one image is printed in the widthwise direction of the sheet, printing widths of a plurality of successive images are equal, and the printing width and the width of the sheet are equal, said determination unit determines, in accordance with the result of the analysis, that the normal preliminary discharge is necessary.

5. The apparatus according to claim 3, wherein in a case where one image is printed in the widthwise direction of the sheet, and at least one of conditions where (1) printing widths of a plurality of successive images are different and (2) the printing width and the width of the sheet are different is satisfied, said determination unit determines, in accordance with the result of the analysis, that the partial preliminary discharge is necessary.

6. The apparatus according to claim 3, wherein in a case where a plurality of images are printed in the widthwise direction of the sheet, printing widths of a plurality of successive image groups are equal, and the printing width and the width of the sheet are equal, said determination unit determines, in accordance with the result of the analysis, that the normal preliminary discharge is necessary.

7. The apparatus according to claim 3, wherein in a case where a plurality of images are printed in the widthwise direction of the sheet, and at least one of conditions where (1) printing widths of a plurality of successive image groups are different and (2) the printing width and the width of the sheet are different is satisfied, said determination unit determines, in accordance with the result of the analysis, that the partial preliminary discharge is necessary.

8. The apparatus according to claim 1, wherein
   the full-line printhead includes a plurality of full-line printheads, and the plurality of full-line printheads discharge inks of different colors.

9. A print control method in a printing apparatus which prints a plurality of images by discharging ink to a sheet by using a full-line printhead while conveying the sheet, comprising:

inputting image data from a host apparatus;

analyzing, from the input image data, a size of an image and a position of the sheet where the image is printed, and determining what type of preliminary discharge is necessary in accordance with a result of the analysis;

generating print data to be used by the full-line printhead by adding, to the image data, data for preliminary discharge complying with the determined type of preliminary discharge; and controlling to print by the full-line printhead based on the generated print data, wherein the preliminary discharge includes:

normal preliminary discharge which is performed between a plurality of images to be printed in a conveyance direction of the sheet by using all nozzles of the full-line printhead, and partial preliminary discharge which is performed by using some nozzles of the full-line printhead in a marginal area where the image is not printed in a widthwise direction of the sheet in a case where a width of an image to be printed in the widthwise direction of the sheet is smaller than a width of the sheet, said determining determines which of the normal preliminary discharge and the partial preliminary discharge is necessary, and at said determining, the marginal area is divided into a plurality of divided areas based on print data used to print before the marginal area in the conveyance direction of the sheet, and for each divided area, whether or not partial preliminary discharge is necessary is determined.

10. A printing apparatus comprising:

a conveyance unit configured to convey a sheet in a first direction;

a full-line printhead in which a plurality of nozzles for discharging ink are arrayed in a second direction intersecting with the first direction;

a preliminary discharge unit configured to cause the full-line printhead to perform preliminary discharge to the sheet; and a control unit configured to, in a case where the full-line printhead forms a first image having a first length in the second direction, and then forms a second image having a second length longer than the first length in the second direction, control said preliminary discharge unit to cause the full-line printhead to perform the preliminary discharge from a nozzle, of the plurality of nozzles, which is not used for forming the first image and is to be used for forming the second image, onto a non-printing area which is adjacent to the first image in the second direction.

11. The apparatus according to claim 10, wherein the preliminary discharge includes normal preliminary discharge which is performed between a plurality of images to be printed in the first direction by using all nozzles of the full-line printhead.

12. The apparatus according to claim 10, wherein
the full-line printhead includes a plurality of full-line printheads, and
the plurality of full-line printheads discharge inks of different colors.

* * * * *